US008463301B2

(12) United States Patent
Wang et al.

(10) Patent No.: US 8,463,301 B2
(45) Date of Patent: Jun. 11, 2013

(54) METHODS AND APPARATUS FOR PAGING IN WIRELESS COMMUNICATION NETWORKS

(75) Inventors: Ying Wang, Easton, PA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 12/750,825

(22) Filed: Mar. 31, 2010

(65) Prior Publication Data

US 2011/0244893 A1    Oct. 6, 2011

(51) Int. Cl.
*H04W 68/00* (2009.01)

(52) U.S. Cl.
USPC .......................................... 455/458; 370/338

(58) Field of Classification Search
USPC .......................................... 455/458; 370/338
See application file for complete search history.

(56) References Cited

U.S. PATENT DOCUMENTS

| 2009/0017801 A1* | 1/2009 | Laroia et al. ............... 455/414.1 |
| 2009/0232143 A1 | 9/2009 | Li et al. |
| 2011/0105155 A1* | 5/2011 | Bienas et al. ................ 455/458 |

FOREIGN PATENT DOCUMENTS

| EP | 1933507 A1 | 6/2008 |
| WO | WO0163808 A1 | 8/2001 |

OTHER PUBLICATIONS

International Search Report and Written Opinion—PCT/US2011/030473—ISA/EPO—Jul. 6, 2011.

\* cited by examiner

*Primary Examiner* — Marcos Batista
(74) *Attorney, Agent, or Firm* — Paul S. Holdaway

(57) ABSTRACT

Paging congestion control in a wireless communications system is described. Various described methods and apparatus are well suited for use in a peer to peer wireless communications system, e.g., an ad hoc peer to peer wireless network in which decisions are made in a decentralized manner. Wireless terminals, e.g., mobile nodes, monitor other paging activities going on and make back-off, e.g., yielding, decisions with regard to paging based on the results of the monitoring. During a first time interval paging indicator signals are transmitted on paging indicator resources by devices intending to transmit paging signals. During a second time interval paging signals are transmitted on paging signaling resources. Monitored and processed detected paging indicator signals are used by a wireless terminal in deciding whether or not to transmit a paging indicator signal and/or a paging signal.

30 Claims, 30 Drawing Sheets

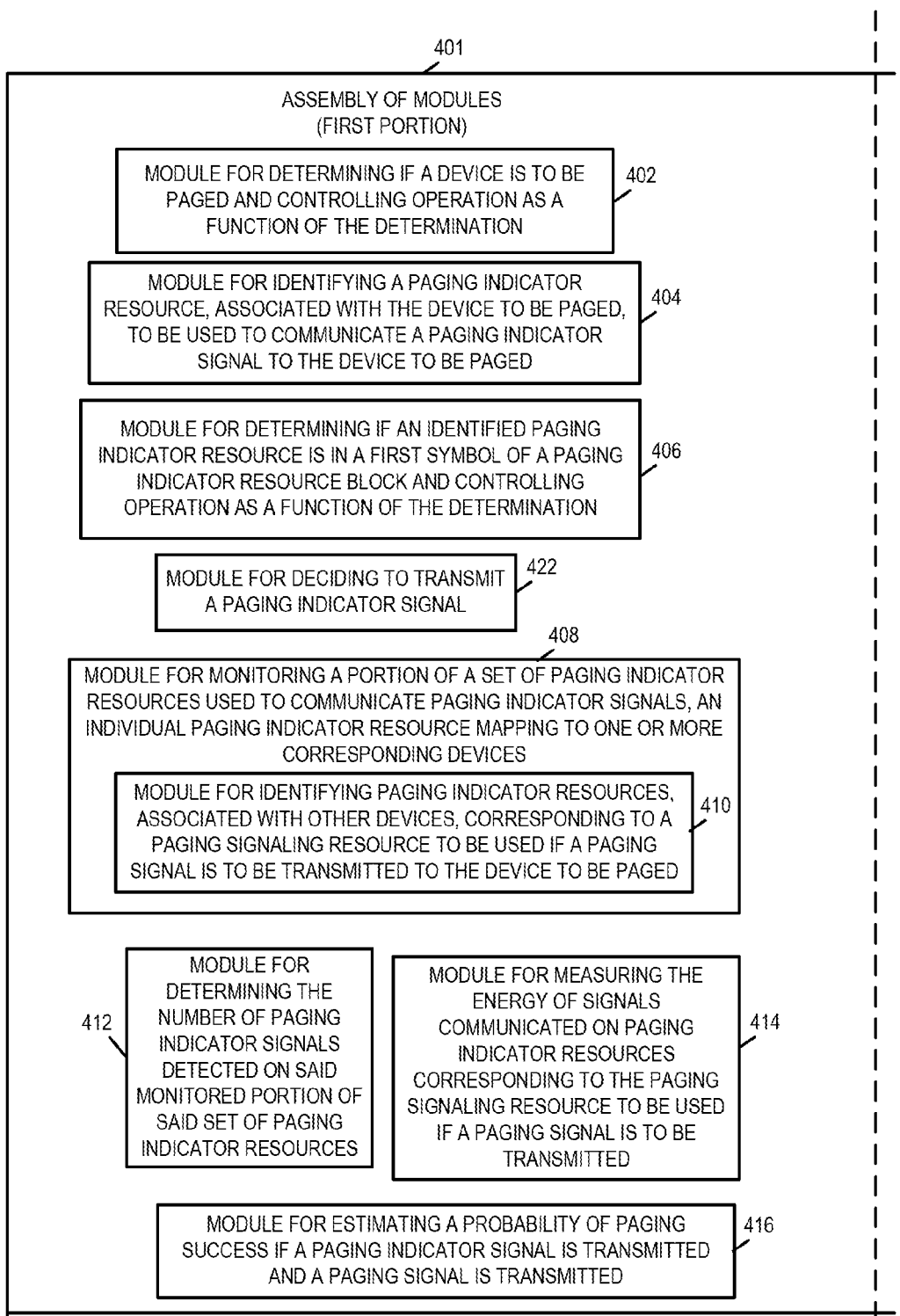

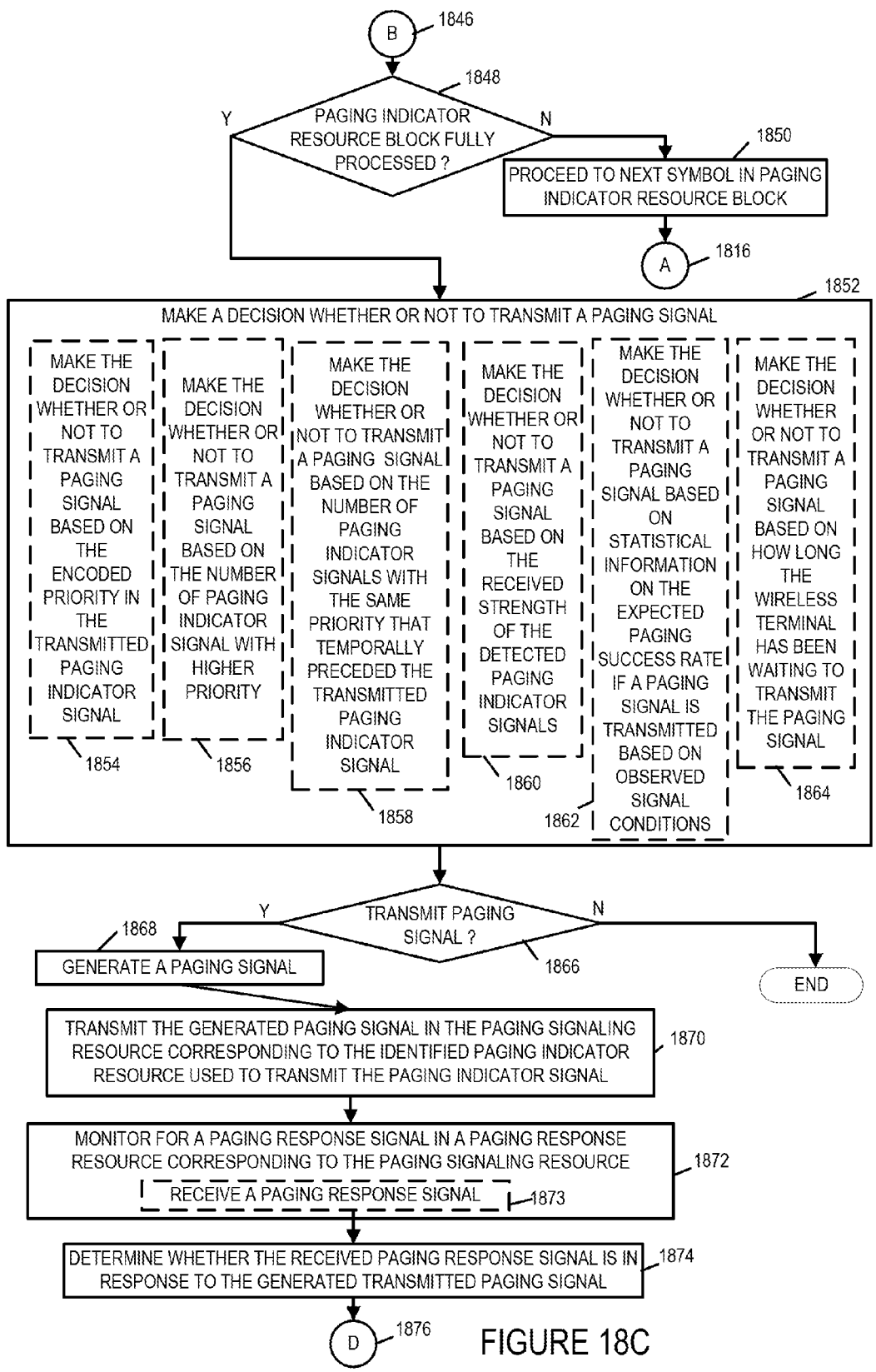

METHODS AND APPARATUS FOR PAGING IN WIRELESS COMMUNICATION NETWORKS

FIELD

Various embodiments relate to wireless communications, and more particularly, to paging method and apparatus, e.g., methods and apparatus which may take into consideration congestion.

BACKGROUND

In many wireless communications systems there is a limited amount of air link resources which are allocated for paging. In a peer to peer system lacking centralized control, devices may frequently use direct peer to peer paging, e.g., to establish connections with one another. Because of the limited amount of air link resource available for paging at least some of the air link resources allocated for paging maybe shared resources. This sharing of paging resources tends to lead to collisions and the inability to recover communicated paging signals which can result in the need for re-transmission of paging signals. Thus collisions due to congestion may result in the wasteful expenditure of limited battery power due to retransmission operations and/or monitoring operations.

The demand, and thus the level of congestion associated with paging loading in a system, may vary over time as a function of the number of devices currently in a local vicinity, activities, types of applications being used, time of day, events, etc. In some systems lacking centralized control with regard to paging resource allocation, gridlock conditions may occur at high congestion times with respect to the paging channels. During high congestion times, paging messages may interfere with each other and it is possible that only a small fraction of them can get through. If devices can not efficiently page one another, desired connections may not be established and traffic flows between peers may be unable to be maintained at an acceptable level.

Based on the above discussion, there is a need for new and/or improved paging methods and apparatus. It would be beneficial if at least some of the new and/or improved paging methods and apparatus could take into consideration signaling congestion, reduce interference, and/or provided improvements in terms of power consumption over known paging techniques.

SUMMARY OF THE INVENTION

Various embodiments are directed to paging in a wireless communications system and, more particularly to paging methods and/or apparatus which are able to take into consideration at least some congestion related factors and/or indicators. Various described methods and apparatus are well suited for use in peer to peer wireless communications system, e.g., an ad hoc peer to peer wireless network in which decisions are made in a decentralized manner. Various embodiments employ a paging congestion control mechanism, wherein the wireless terminals, e.g., mobiles, monitor other paging activities going on, thereby providing an indication of congestion, and make back-off, e.g., yielding, decisions with regard to paging based on the results of the monitoring. Managed page yielding in accordance with various exemplary embodiments facilitates more efficient communications which increase the likelihood that a transmitted paging message will be successfully recovered by the intended recipient. In addition, various described method and apparatus tend to conserve battery resources by reducing the amount of paging message re-transmissions and/or increasing the amount of time when wireless terminal may sleep.

Various exemplary methods and apparatus use a multi-stage paging method. During a first time interval, paging indicator signals are transmitted on paging indicator resources by devices intending to transmit paging signals. During a second time interval paging, signals are transmitted on paging signaling resources. In various embodiments, a paging indicator resource corresponds to a wireless terminal to which a page may be directed, and multiple paging indicator resources correspond to the same paging signaling resource.

A paging indicator signal is communicated using a relatively small amount of air link resources, e.g., one or two OFDM tone-symbols, in comparison to a paging signaling resource, e.g., which may use seven or more OFDM tone-symbols. A paging indicator signal communicates an indication of an intended paging signal transmission. In various embodiments, the paging indicator signal indirectly identifies the device to which the paging indicator signal is being directed by the location of the paging indicator signal within a paging indicator resource block. In some embodiments, the paging indicator signal communicates a page priority, e.g., one of four possible priority levels. In various embodiments, a paging signal communicates a paging message, e.g., a paging message including device identifier information directly embedded in the message.

A wireless terminal monitors paging indicator signaling occurring during times in which it is not transmitting a paging indicator signal, e.g., the wireless terminal measures signal strength on detected signals, counts the number of paging indicator signals directed to other wireless terminals, and considers priority information with regard to the other paging indicator signals. A wireless terminal, which desires to transmit a paging signal, makes a decision whether or not to transmit a paging indicator signal and/or whether or not to transmit a paging signal based on the detected paging activity of other devices during the paging indicator signaling interval.

An exemplary method of operating a wireless terminal, in accordance with some embodiments, includes: monitoring a portion of a set of paging indicator resources used to communicate paging indicator signals, determining the number of paging indicator signals detected on said monitored portion of said set of paging indicator resources; and making a decision whether or not to transmit a paging indicator signal based on the determined number of detected paging indicator signals. An individual paging indicator resource in some such embodiments, maps to one or more corresponding devices.

An exemplary wireless terminal, in accordance with some embodiments, comprises: at least one processor configured to: monitor a portion of a set of paging indicator resources used to communicate paging indicator signals, an individual paging indicator resource mapping to one or more corresponding devices; determine the number of paging indicator signals detected on said monitored portion of said set of paging indicator resources; and make a decision whether or not to transmit a paging indicator signal based on the determined number of detected paging indicator signals. The exemplary wireless terminal further comprises memory coupled to said at least one processor.

An exemplary method of operating a wireless terminal, in accordance with some embodiment, comprises: identifying a paging indicator resource to use in transmitting a paging indicator signal; transmitting a paging indicator signal on the identified paging indicator resource; and making a decision whether or not to transmit a paging signal using a paging signaling resource corresponding to said identified paging indicator resource. An exemplary wireless terminal, in accordance with some embodiments, comprises: at least one processor configured to: identify a paging indicator resource to use in transmitting a paging indicator signal, transmit a paging indicator signal on the identified paging indicator resource, and make a decision whether or not to transmit a paging signal using a paging signaling resource corresponding to said identified paging indicator resource. The exemplary wireless terminal further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 4A is a first portion of an assembly of modules which can, and in some embodiments is, used in the wireless terminal illustrated in FIG. 3.

FIG. 18C is a third part of a flowchart of an exemplary method of operating a wireless terminal in accordance with an exemplary embodiment.

DETAILED DESCRIPTION

Figure 1:
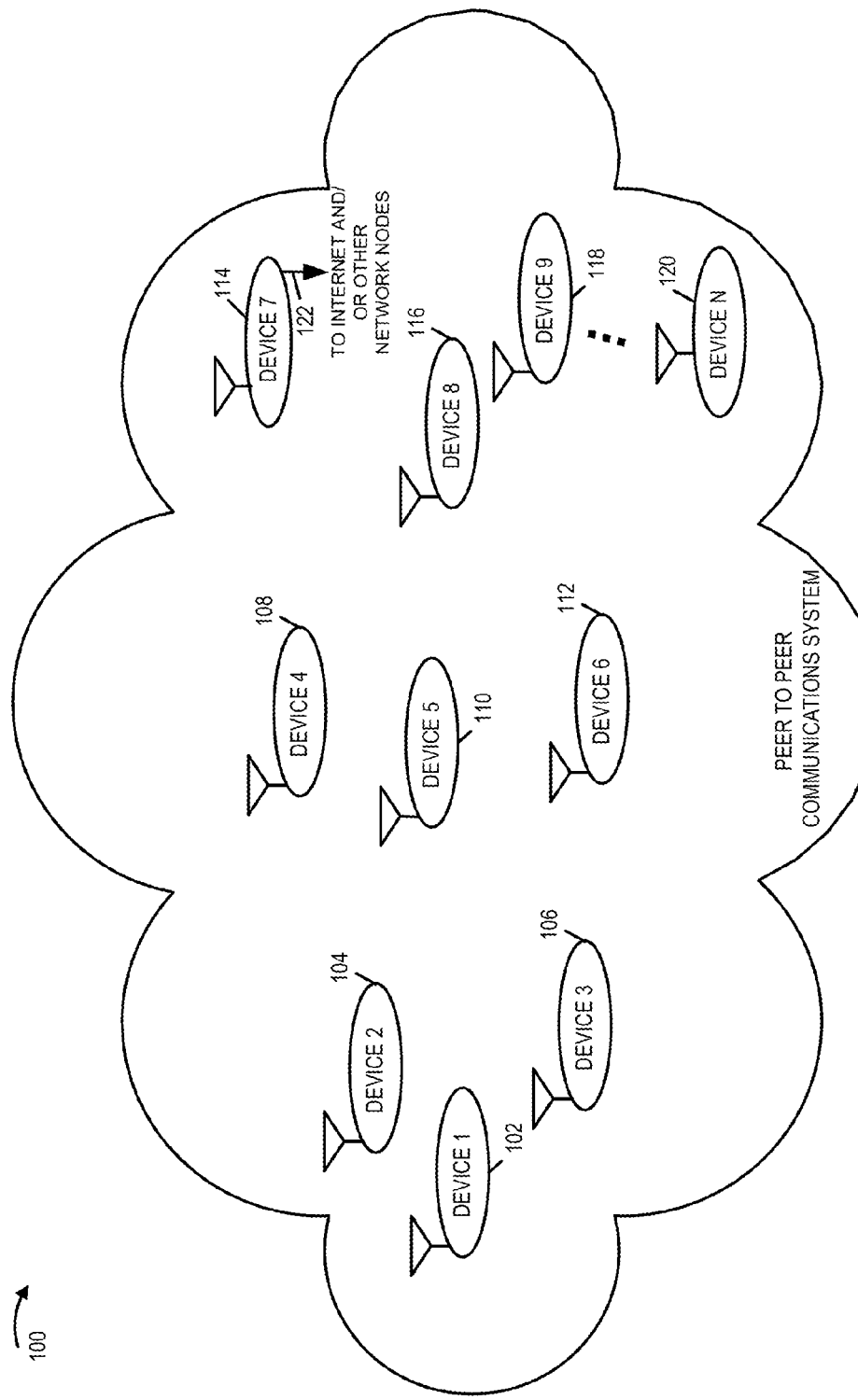
FIG. 1 is a drawing of an exemplary wireless peer to peer communications system in accordance with an exemplary embodiment.

FIG. 1 is a drawing of an exemplary wireless peer to peer communications system 100 in accordance with an exemplary embodiment. Exemplary wireless peer to peer communications system 100 includes a plurality of wireless communications devices (device 1 102, device 2 104, device 3 106, device 4 108, device 5 110, device 6 112, device 7 114, device 8 116, device 9 118, . . . , device N 120. Some of the wireless communications devices in system 100, e.g., device 7 114, include an interface 122, to the Internet and/or other network nodes. Some of the wireless communications devices in system 100, e.g., device 1 102, device 2 104, device 3 106, device 4 108, device 5 110, device 6 112, device 8 116, device 9 118 and device N 120, are mobile wireless communications devices, e.g., handheld mobile devices.

The wireless communications devices in system 100 are, e.g., wireless terminals, supporting direct peer to peer communications. The wireless communications devices in system 100 support direct peer to peer paging. The peer to peer paging protocol used by devices in exemplary system 100 includes paging indicator signaling using paging indicator air link resources and paging signaling using paging signaling air link resources. In some such embodiments, the peer to peer paging protocol also includes paging response signaling using paging response signaling resources.

Figure 2A:
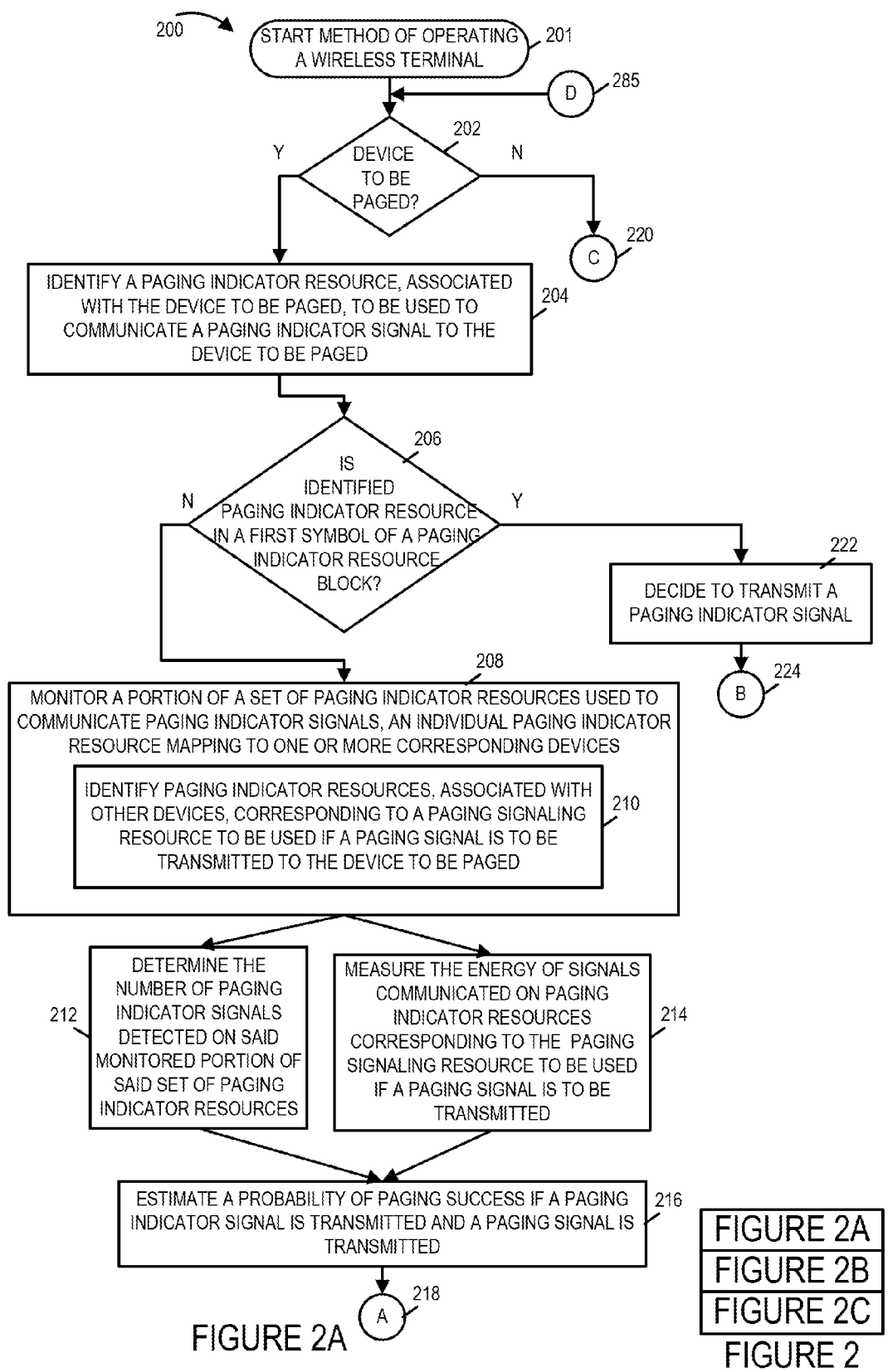
FIG. 2A is a first part of a flowchart of an exemplary method of operating a wireless terminal in accordance with various exemplary embodiments.
Figure 2B:
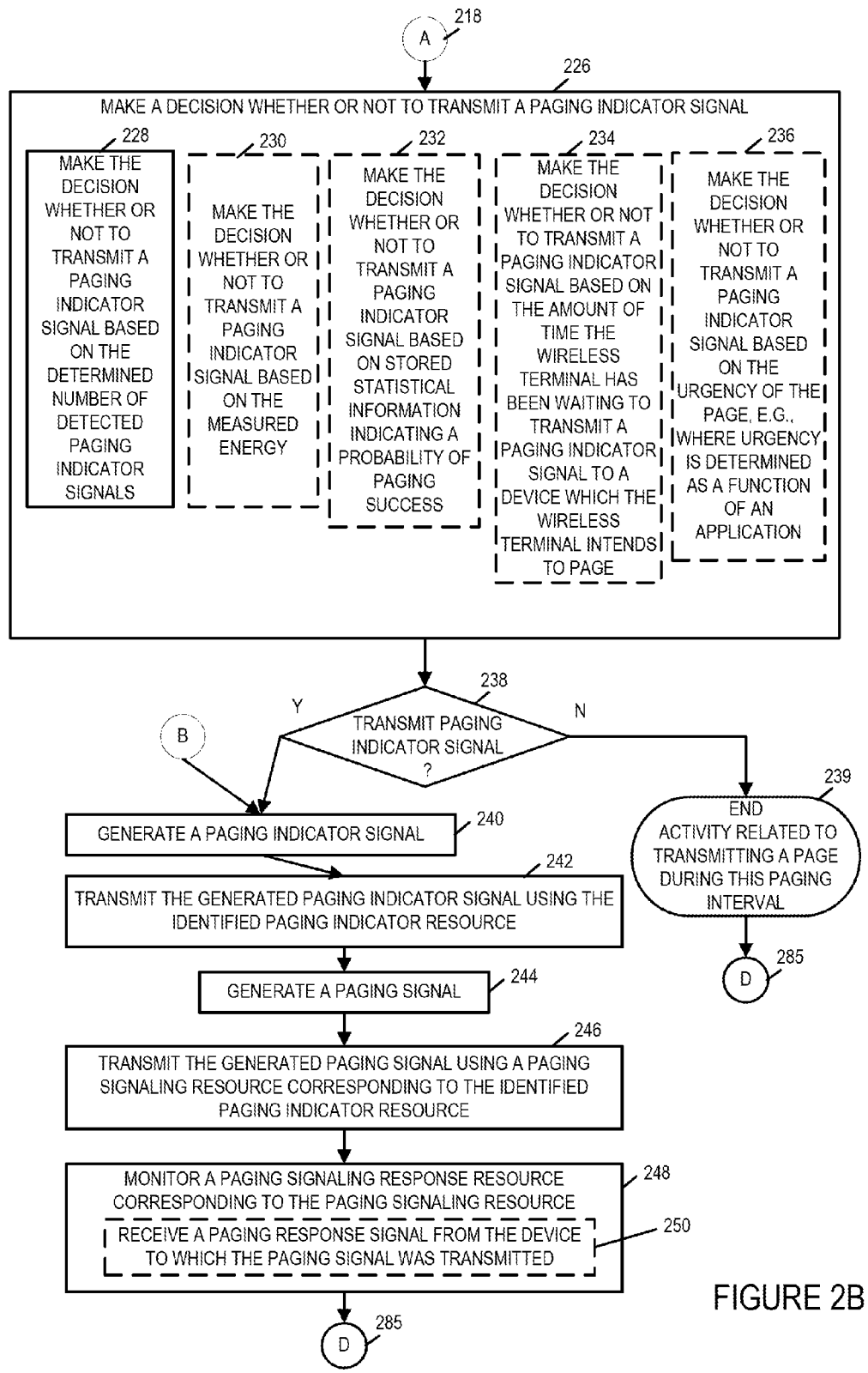
FIG. 2B is a second part of a flowchart of an exemplary method of operating a wireless terminal in accordance with various exemplary embodiments.
Figure 2C:
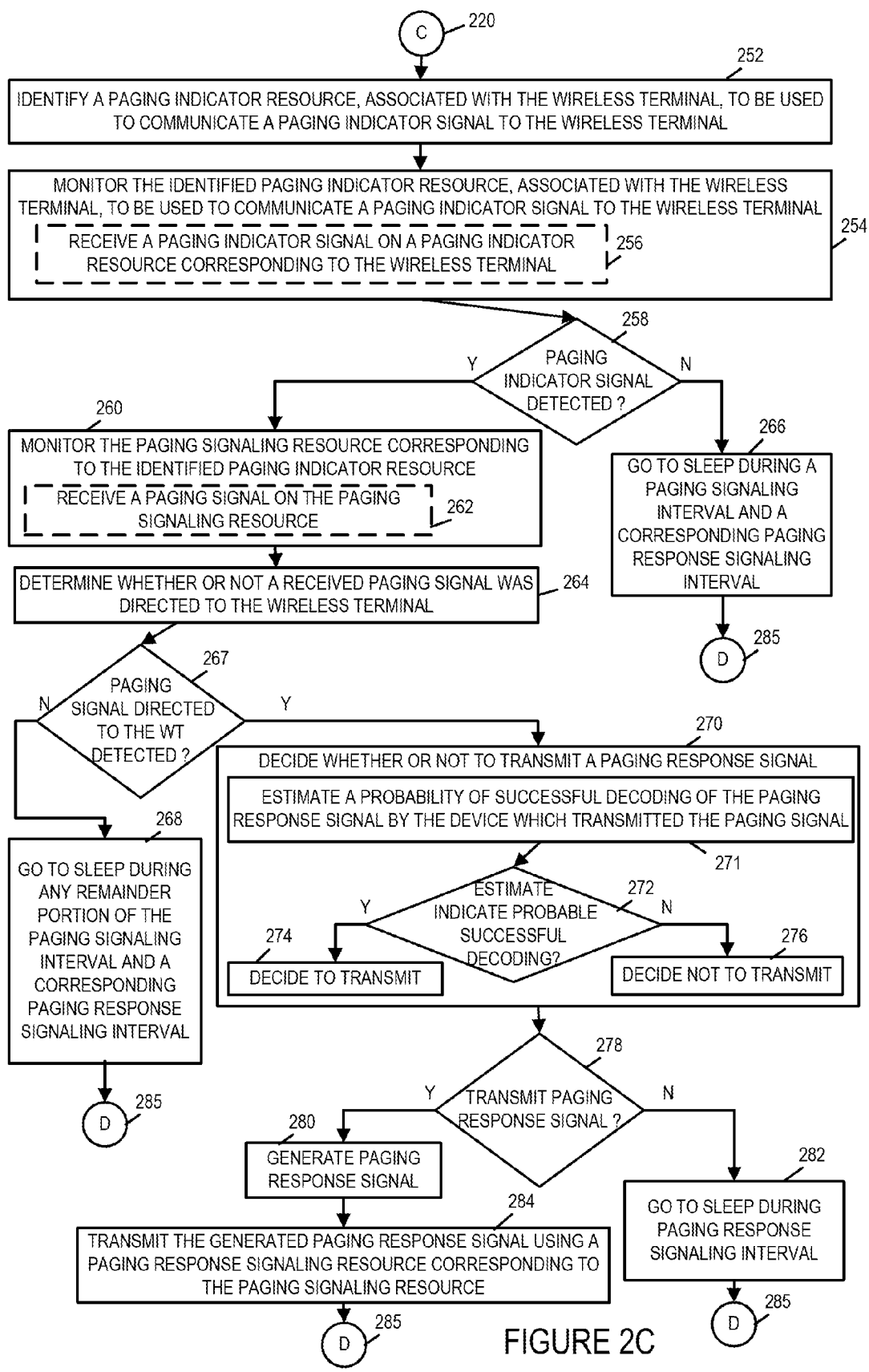
FIG. 2C is a third part of a flowchart of an exemplary method of operating a wireless terminal in accordance with various exemplary embodiments.

FIG. 2, comprising the combination of FIG. 2A, FIG. 2B and FIG. 2C, is a flowchart 200 of an exemplary method of operating a wireless terminal in accordance with an exemplary embodiment. Operation starts in step 201, where the wireless terminal is powered on and initialized and proceeds to step 202. In step 202 the wireless terminal determines if there is a device that it desires to page. If there is a device to be paged, then operation proceeds from step 202 to step 204; however, if there is not a device to be paged, then operation proceeds from step 202 via connecting node C 220 to step 252.

Returning to step 204, in step 204 the wireless terminal identifies a paging indicator resource, associated with the device to be paged, to be used to communicate a paging indictor signal to the device to be paged. Operation proceeds from step 204 to step 206. In step 206 the wireless terminal determines whether the identified paging indicator resource of step 204 is located in a first symbol of a paging indicator resource block. If the identified paging indicator resource of step 204 is in a first symbol of a paging indicator resource block, then operation proceeds from step 206 to step 222 in which the wireless terminal decides to transmit a paging indicator signal. Operation proceeds from step 222 via connecting node B 224 to step 240. Returning to step 206, in step 206, if the identified paging indicator resource of step 204 is not in the first symbol of the paging indictor resource block, then operation proceeds from step 206 to step 208.

In step 208 the wireless terminal monitors a portion of a set of paging resources used to communicate paging indicator signals. An individual paging indicator resource maps to one or more corresponding devices. In some embodiments, different individual paging indicator resources map to different corresponding devices. Multiple individual paging indicator resources in a paging indicator resource block correspond to the same paging signaling resource. In various embodiments, a page signaling resource has a corresponding paging signaling response resource. In various embodiments, multiple paging indicator resources correspond to the same paging signaling resource, and at least some of said multiple paging indicator resources corresponding to the same paging signaling resource occur in different transmission time slots, and at least one of said different transmission time slots follows said monitoring. In various embodiments, said paging indicator resources are single OFDM tone-symbols.

Step 208 includes step 210 in which the wireless terminal identifies paging indicator resource, associated with other devices, corresponding to a paging signaling resource to be used if a paging signal is to be transmitted to the device to be paged. In various embodiments, the identified paging indicator resources of step 210 are those paging indicator resources associated with other devices, corresponding to the paging signaling resource to be used if a paging signaling is to be transmitted to the device to be paged, which temporarily precede the identified paging indicator resource of step 204 in the paging indicator resource block. In various embodiments, the identified paging indicator resources of step 210 are the monitored portion of a set of paging indicator resources of step 208.

Operation proceeds from step 208 to step 212 and 214. In step 212 the wireless terminal determines the number of paging indicator signals detected on said monitored portion of said set of paging indicator resources. In step 214 the wireless terminal measures the energy of signals communicated on paging indicator resources corresponding to the paging signaling resource to be used if a page is transmitted. Operation proceeds from step 212 and 214 to step 216.

In step 216 the wireless terminal estimates a probability of success if a paging indicator signal is transmitted and a paging signal is transmitted. Operation proceeds from step 216 via connecting node A 218 to step 226. In step 226 the wireless terminal makes a decision whether or not to transmit a paging indicator signal. Step 226 includes step 228, in which the wireless terminal makes the decision whether or not to transmit a paging indicator signal based on the determined number of detected paging indicator signals, e.g., from the determination of step 212. In some embodiments, step 226 includes one or more or all of steps 230, 232, 234, and 236. In step 230 the wireless terminal makes the decision whether or not to transmit a paging indicator signal based on the measured energy, e.g., from the measurements of step 214. In step 232 the wireless terminal makes the decision whether or not to transmit a paging indicator signal based on stored statistical information indicating a probability of paging success, e.g., from the estimation of step 216. In step 234 the wireless terminal makes the decision whether or not to transmit a paging indicator signal based on the amount of time the wireless terminal has been waiting to transmit a paging indicator signal to a device which the wireless terminal intends to page. In step 236 the wireless terminal makes the decision whether or not to transmit a paging indicator signal based on the urgency of the page. In some such embodiments, the wireless terminal determines the urgency as a function of the application to be used between the wireless terminal and the device it intends to page. Various exemplary applications include a gaming application with a communications deadline and a video application with a communications deadline.

Operation proceeds from step 226 to step 238 in which the wireless terminal controls operations as a function of the decision of step 226. If the decision is to transmit a paging indicator signal, then operation proceeds from step 238 to step 240; otherwise, operation proceeds from step 238 to step 239 where the wireless terminal ends activity related to transmitting a page during this paging interval.

Returning to step 240, in step 240 the wireless terminal generates a paging indicator signal. In various embodiments, the paging indicator signal is a single tone signal, e.g., a single tone signal communicating one OFDM modulation symbol. Operation proceeds from step 240 to step 242 in which the wireless terminal transmits the generated paging indicator signal using the identified paging indicator resource, e.g., a single OFDM tone-symbol in the paging indicator resource block.

Operation proceeds from step 242 to step 244, in which the wireless terminal generates a paging signal. Then, in step 246 the wireless terminal transmits the generated paging signal using a paging signaling resource corresponding to the identified paging indicator resource. Operation proceeds from step 246 to step 248. In step 248 the wireless terminal monitors a paging signal response resource corresponding to the paging signaling resource used in step 246. Step 248 may, and sometimes does, include step 250 in which the wireless terminal receives a paging response signal from the device to which the paging signal was transmitted.

Returning to step 252, in step 252 the wireless terminal identifies a paging indicator resource, associated with the wireless terminal, to be used to communicate a paging indicator signal to the wireless terminal. Then, in step 254 the wireless terminal monitors the identified paging indicator resource, associated with the wireless terminal, to be used to communicate a paging indicator signal to the wireless terminal. Step 254 may, and sometimes does, includes step 256 in which the wireless terminal receives a paging indictor signal on a paging indicator resource corresponding to the wireless terminal. Operation proceeds from step 254 to step 258.

In step 258 the wireless terminal determines whether or not a paging indicator signal has been detected by the monitoring of step 254. If a paging indicator signal has been detected, then operation proceeds from step 258 to step 260; otherwise, operation proceeds from step 258 to step 266 in which the wireless terminal is controlled to go to sleep during a paging signaling interval and a corresponding paging response signaling interval.

Returning to step 260, in step 260 the wireless terminal monitors the paging signaling resource corresponding to the identified paging indicator resource of step 252. Step 260 may, and sometimes does, include step 262, in which the wireless terminal receives a paging signal on the paging signal resource which is being monitored. Operation proceeds from step 260 to step 264. In step 264 the wireless terminal determines whether or not a received paging signal directed to the wireless terminal was detected during the monitoring of step 260. Operation proceeds from step 264 to step 267. If a paging signal directed to the wireless terminal was detected then operation proceeds from step 267 to step 270; otherwise, operation proceeds from step 267 to step 268 in which the wireless terminal is controlled to go to sleep during any remainder portion of the paging signaling interval and a corresponding paging signaling response interval.

Returning to step 270, in step 270 the wireless terminal determines whether or not to transmit a paging response signal. Step 270 includes steps 271, 272, 274, and 276. In step 271 the wireless terminal estimates a probability of successful decoding of the paging response signal by the device which transmitted the paging signal, should the wireless terminal decide to transmit a paging response signal. In various embodiments, the estimation of the probability of success is a function of interference. Operation proceeds from step 271 to step 272. In step 272, if the estimate of step 271 indicates probable successful decoding, then operation proceeds from step 272 to step 274 where the wireless terminal decides to transmit the paging response signal. However, in step 272, if the estimate of step 271 indicates that it is not probable that the decoding will be successful, then operation proceeds from step 272 to step 276, where the wireless terminal decided not to transmit the paging response signal. Operation proceeds from step 270 to step 278.

In step 278 the wireless terminal controls operation as a function of the decision of step 270. If the wireless terminal has decided to transmit a paging response signal, then operation proceeds from step 278 to step 280; otherwise, operation proceeds from step 278 to step 282 where the wireless terminal is controlled to go to sleep during the paging response signaling interval.

Returning to step 280, in step 280 the wireless terminal generates a paging response signal. Then, in step 284 the wireless terminal transmits the generated paging response signal using a paging response signaling resource corresponding to the paging signaling resource of step 260.

Operation proceeds from any of steps 239, 248, 266, 268, 282 or 284, via connecting node D 285, to step 202 for operations related to a subsequent paging interval.

In some embodiments, one individual paging resource can correspond to multiple devices.

Figure 3:
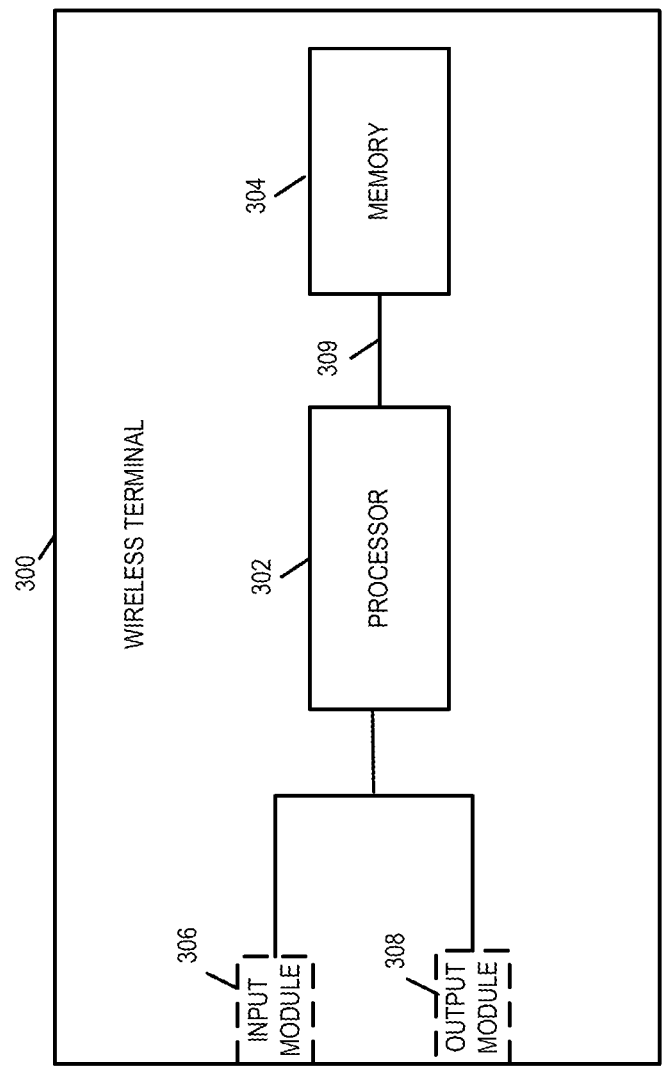
FIG. 3 is a drawing of an exemplary wireless terminal, in accordance with an exemplary embodiment.

FIG. 3 is a drawing of an exemplary wireless terminal 300, in accordance with an exemplary embodiment. Exemplary wireless terminal 300 is, e.g., one of the wireless communications devices of FIG. 1. Exemplary wireless terminal 300 may, and sometimes does, implement a method in accordance with flowchart 200 of FIG. 2.

Wireless terminal 300 includes a processor 302 and memory 304 coupled together via a bus 309 over which the various elements (302, 304) may interchange data and information. Wireless terminal 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to monitor a portion of a set of paging indicator resources used to communicate paging indicator signals, an individual paging indicator resource mapping to one or more corresponding devices; determine the number of paging indicator signals detected on said monitored portion of said set of paging indicator resources; and make a decision whether or not to transmit a paging indicator signal based on the determined number of detected paging indicator signals. In some embodiments, processor 302 is further configured to: receive a paging indicator signal on a paging indicator resource corresponding to the wireless terminal; receive a paging signal on a paging signaling resource; and decide whether or not to transmit a paging response signal.

In some embodiments, processor 302 is configured to: estimate a probability of successful decoding of the paging response signal by the device which transmitted said paging signal; and decide to transmit when said estimate indicates probable successful decoding, as part of being configured to decide whether or not to transmit a paging response signal. In various embodiments, processor 302 is further configured to determine whether or not said received paging signal was directed to said wireless terminal.

In some embodiments, different individual paging indicator resources map to different corresponding devices. In some embodiments, a first plurality of individual paging indicator resources in a paging resource block correspond to a first paging signaling resource, and a second plurality of individual paging indicator resources in the paging resource block correspond to a second paging signaling resource. In some such embodiments, the first paging signaling resource corresponds to a first paging response resource, and the second paging signaling resource corresponds to a second paging response resource. In some embodiments, a paging indicator resource is a single OFDM tone-symbol, and a paging signaling resource is a set of at least seven OFDM tone-symbols.

In various embodiments, processor 302 is further configured to: measure energy of signals communicated on paging indicator resources corresponding to a paging signaling resource to be used if a paging signal is to be transmitted. In some embodiments, processor 302 is configured to base the decision whether or not to transmit a paging indicator signal on the measured energy. In some embodiments, processor 302 is further configured to base said decision whether or not to transmit a paging indicator signal on stored statistical information indicating a probability of paging success. In various embodiments, processor 302 is further configured to base the decision whether or not to transmit a paging indicator signal on an amount of time the wireless terminal has been waiting to transmit a paging indicator signal to a device which the wireless terminal intends to page.

In some embodiments, multiple paging indicator resources correspond to the same paging signaling resource, at least some of said multiple paging indicator resources corresponding to the same paging signaling resource occurring in different transmission time slots, and during at least some times, at least one of said different transmission time slots follows said monitoring.

In some embodiments, the paging indicator resources are single OFDM tone-symbols. In some such embodiments, a paging indicator signal communicates a single modulation symbol. In some embodiments, a paging signal communicates multiple modulation symbols.

Figure 4B:
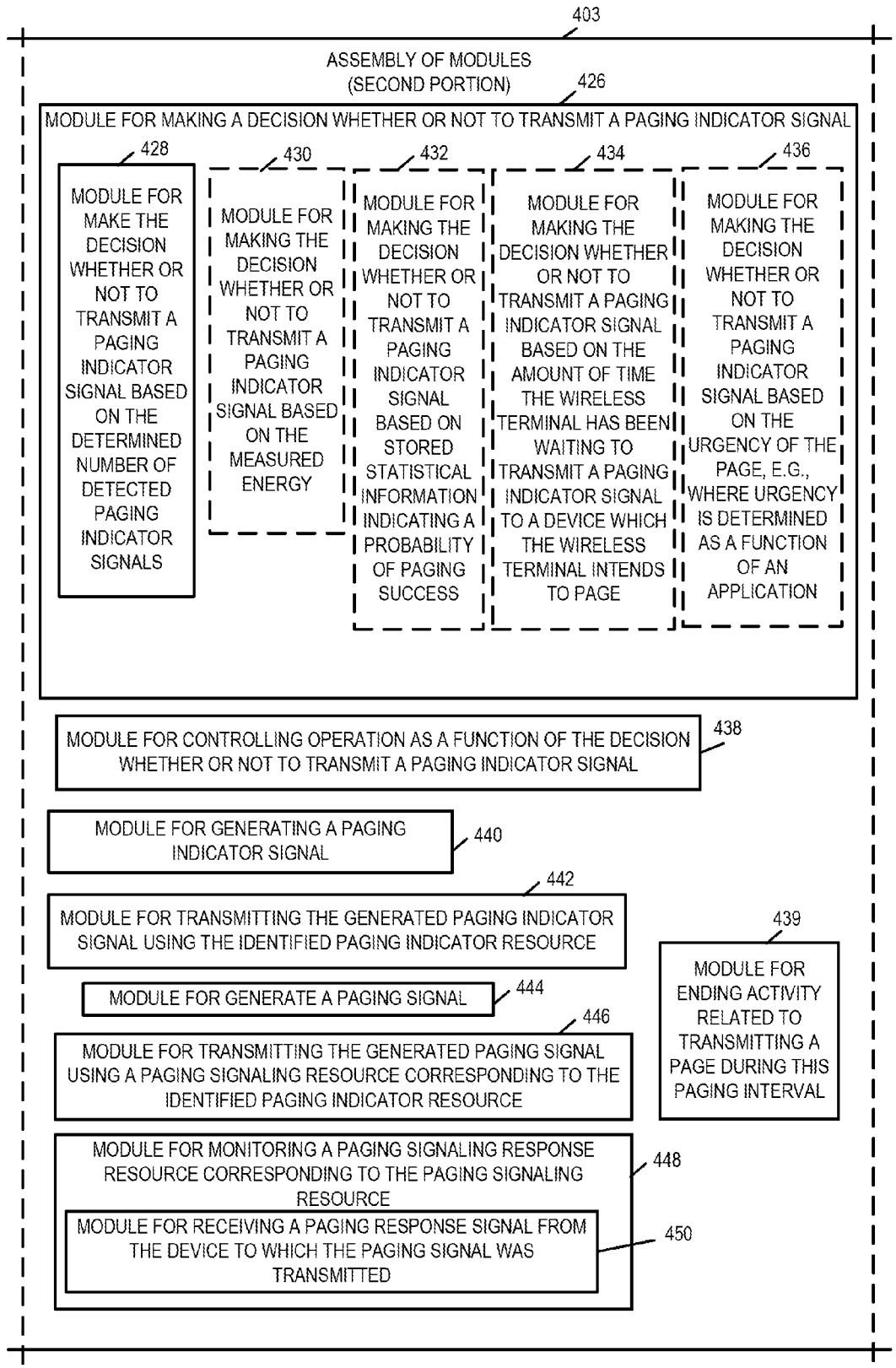
FIG. 4B is a second portion of an assembly of modules which can, and in some embodiments is, used in the wireless terminal illustrated in FIG. 3.
Figure 4C:
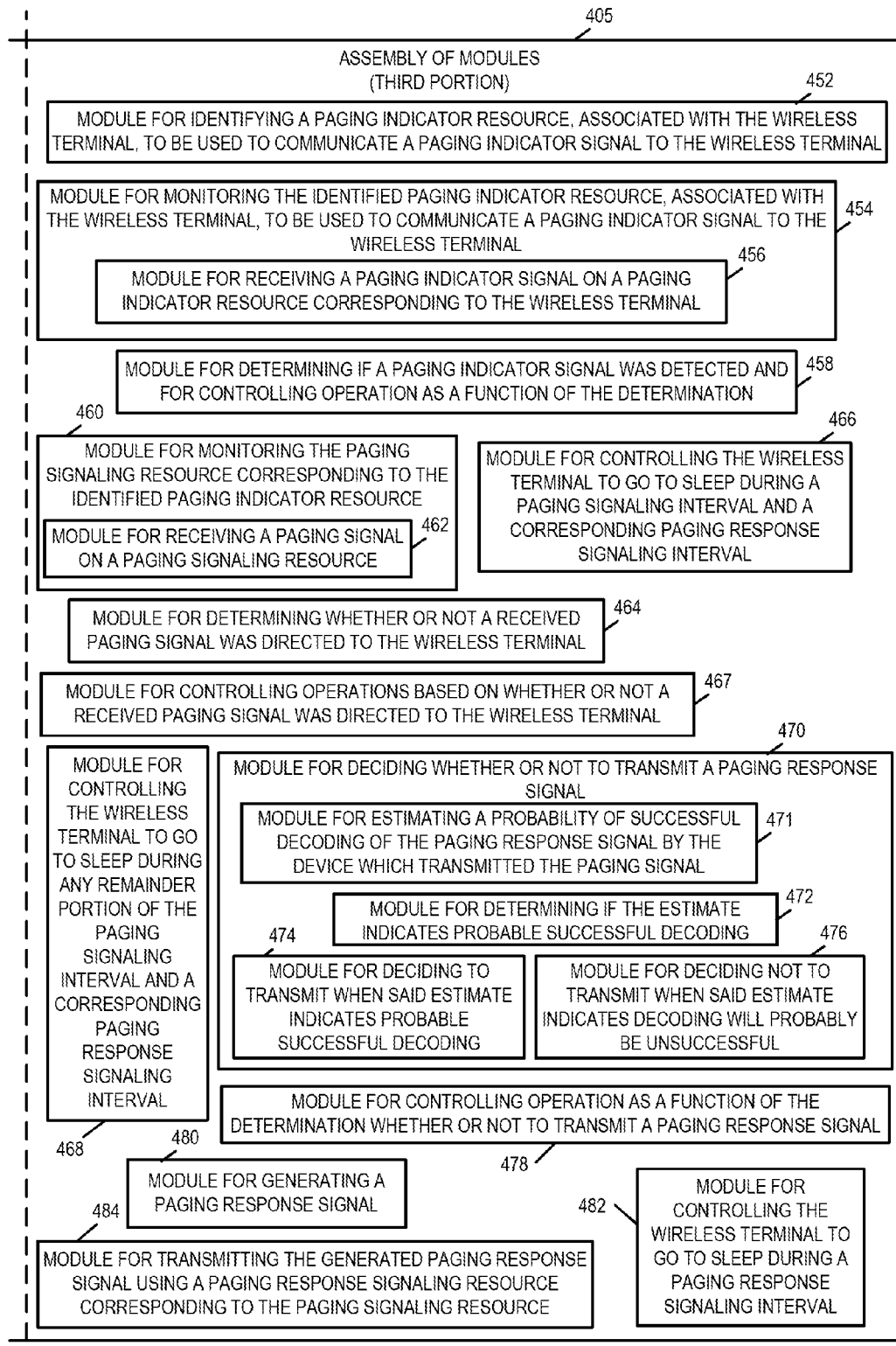
FIG. 4C is a third portion of an assembly of modules which can, and in some embodiments is, used in the wireless terminal illustrated in FIG. 3.

FIG. 4, comprising the combination of FIG. 4A, FIG. 4B and FIG. 4C is an assembly of modules 400 which can, and in some embodiments is, used in the wireless terminal 300 illustrated in FIG. 3. Assembly of modules 400 includes portion 401, portion 403 and portion 405. The modules in the assembly 400 can be implemented in hardware within the processor 302 of FIG. 3, e.g., as individual circuits. Alternatively, the modules may be implemented in software and stored in the memory 304 of the wireless terminal 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless terminal 300 or elements therein such as the processor 302, to perform the functions of the corresponding steps illustrated and/or described in the method of flowchart 200 of FIG. 2.

FIG. 4, comprising the combination of FIG. 4A, FIG. 4B and FIG. 4C, is an assembly of modules 400 in accordance with an exemplary embodiment. Assembly of modules 400 includes first portion 401, second portion 403 and third portion 405. Assembly of modules 400 includes a module 402 for determining if a device is to be paged and for controlling operation as a function of the determination, a module 404 for identifying a paging indicator resource, associated with the device to be paged, to be used to communicate a paging indicator signal to the device to be paged, and a module 406 for determining if an identified paging indicator resource is in a first symbol of a paging indicator resource block and for controlling operation as a function of the determination.

Assembly of modules 400 further includes a module 422 for deciding to transmit a paging indicator signal when it is determined that the identified paging indicator resource is in a first symbol of a paging indicator resource block, a module 408 for monitoring a portion of a set of paging indicator resources used to communicate paging indicator signals, wherein an individual paging indicator resource maps to one or more corresponding devices, a module 412 for determining the number of paging indicator signals detected on said monitored portion of said set of paging indicator resources, a module 414 for measuring the energy of signals communicated on paging indicator resources corresponding to the paging signaling resource to be used if a paging signal is to be transmitted, and a module 416 for estimating a probability of paging success if a paging indicator signal is transmitted and a paging signal is transmitted. Module 408 includes a module 410 for identifying paging indicator resources, associated with other devices, corresponding to a paging signaling resource to be used if a paging signal is to be transmitted to the device to be paged.

Assembly of module 400 further includes a module 426 for making a decision whether or not to transmit a paging indicator signal, a module 438 for controlling operations as a function of the decision whether or not to transmit a paging indicator signal, a module 440 for generating a paging indicator signal, and a module 442 for transmitting the generated paging indicator signal using the identified paging indicator resource, a module 444 for generating a paging signal, a module 446 for transmitting the generated paging signal using a paging signaling resource corresponding to the identified paging indicator resource, a module 448 for monitoring a paging signaling response resource corresponding to the paging signaling resource, and a module 439 for ending activity related to transmitting a paging signal during this paging interval. Module 426 includes a module 428 for making the decision whether or not to transmit a paging indicator signal based on the determined number of paging indicator signals.

In some embodiments, module 426 also includes one or more or all of: a module 430 for making the decision whether or not to transmit a paging indicator signal based on the measured energy, a module 432 for making the decision whether or not to transmit a paging indicator signal based on stored statistical information indicating a probability of paging success, a module 434 for making the decision whether or not to transmit a paging indicator signal based on the time the wireless terminal has been waiting to transmit a paging indicator signal to a device which the wireless terminal intends to page and a module 436 for making the decision whether or not to transmit a paging indicator signal based on the urgency of the page, e.g., where urgency is determined as a function of an application. Module 448 includes a module 450 for receiving a paging response signal from the device to which the paging signal was transmitted.

Assembly of modules 400 further includes a module 452 for identifying a paging indicator resource, associated with the wireless terminal, to be used to communicate a paging indicator signal to the wireless terminal, a module 454 for monitoring the identified paging indicator resource, associated with the wireless terminal, to be used to communicate a paging indicator signal to the wireless terminal, a module 458 for determining if a paging indicator signal was detected and for controlling operations as a function of the determination, a module 460 for monitoring the paging signaling resource corresponding to the identified paging indicator resource, a module 466 for controlling the wireless terminal to go to sleep during a paging signaling interval and a corresponding paging response signaling interval, and a module 464 for determining whether or not a received paging signal was directed to the wireless terminal, a module 467 for controlling operations based upon whether or not a paging signal directed to the wireless terminal was detected. Assembly of modules 400 further includes a module 470 for deciding whether or not to transmit a paging response signal, a module 468 for controlling the wireless terminal to go to sleep during any remainder portion of the paging signaling interval and a corresponding paging response signaling interval when it is determined that a paging signal directed to the wireless terminal has not been detected, a module 478 for controlling operation as function of the determination whether or not to transmit a paging response signal, a module 480 for generating a paging response signal, a module 482 for controlling the wireless terminal to go to sleep during a paging response signaling interval when it is determined not to transmit a paging response signal, and a module 484 for transmitting the generated paging response signals using a paging response signaling resource corresponding to the paging signaling resource.

Module 454 includes a module 456 for receiving a paging indicator signal on a paging indicator resource corresponding to the wireless terminal. Module 460 includes a module 462 for receiving a paging signal on a paging signaling resource. Module 470 includes a module 471 for estimating a probability of successful decoding of the paging response signal by the device which transmitted the paging signal, e.g., based on interference measurements and/or estimates, and a module 472 for determining if the estimate indicates probable successful decoding and for controlling operation as a function of the determination. Module 470 further includes a module 474 for deciding to transmit said paging response signal when said estimate indicates probable successful decoding and a module 476 for deciding not to transmit said paging response signal when said estimate indicates that decoding will probably be unsuccessful.

Figure 5:
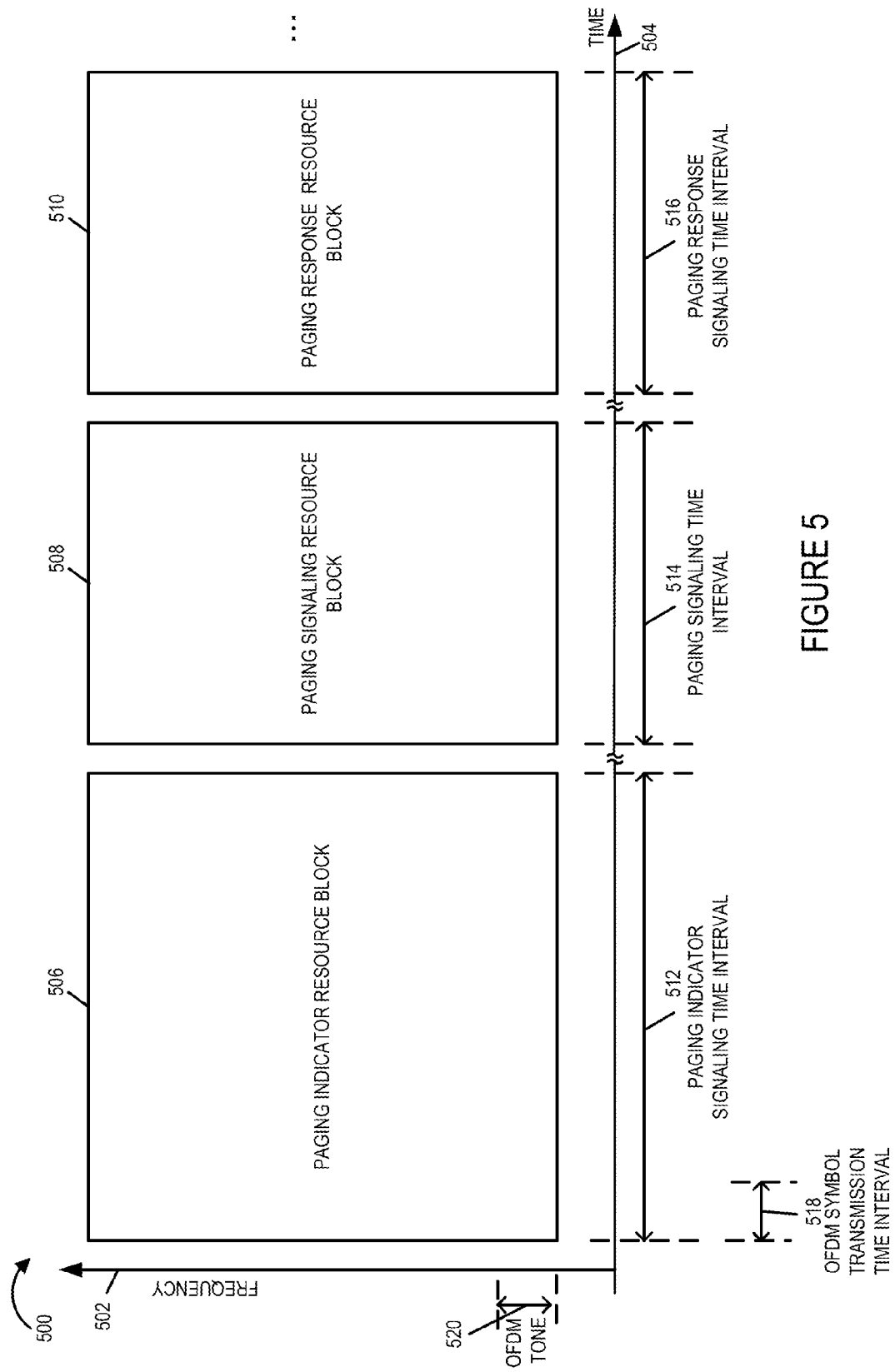
FIG. 5 is a drawing illustrating a portion of an exemplary peer to peer recurring timing structure in accordance with some embodiments.

FIG. 5 is a drawing 500 illustrating a portion of an exemplary peer to peer recurring timing structure may be used in some embodiments, e.g., an embodiment implementing a method in accordance with flowchart 200 of FIG. 2, a wireless terminal 300 of FIG. 3 and/or an assembly of modules 400 of FIG. 4. Vertical axis 502 represents frequency and includes a plurality of OFDM tones 520. The horizontal axis 504 represents time and includes a plurality of OFDM symbol transmission time intervals. The exemplary peer to peer air link resources includes a paging indicator resource block 506, a corresponding paging signaling resource block 508, and a corresponding paging response resource block 510, which occur during a paging indicator signaling time interval 512, a paging signaling time interval 514, and a paging response signaling time interval 516, respectively.

Figure 6:
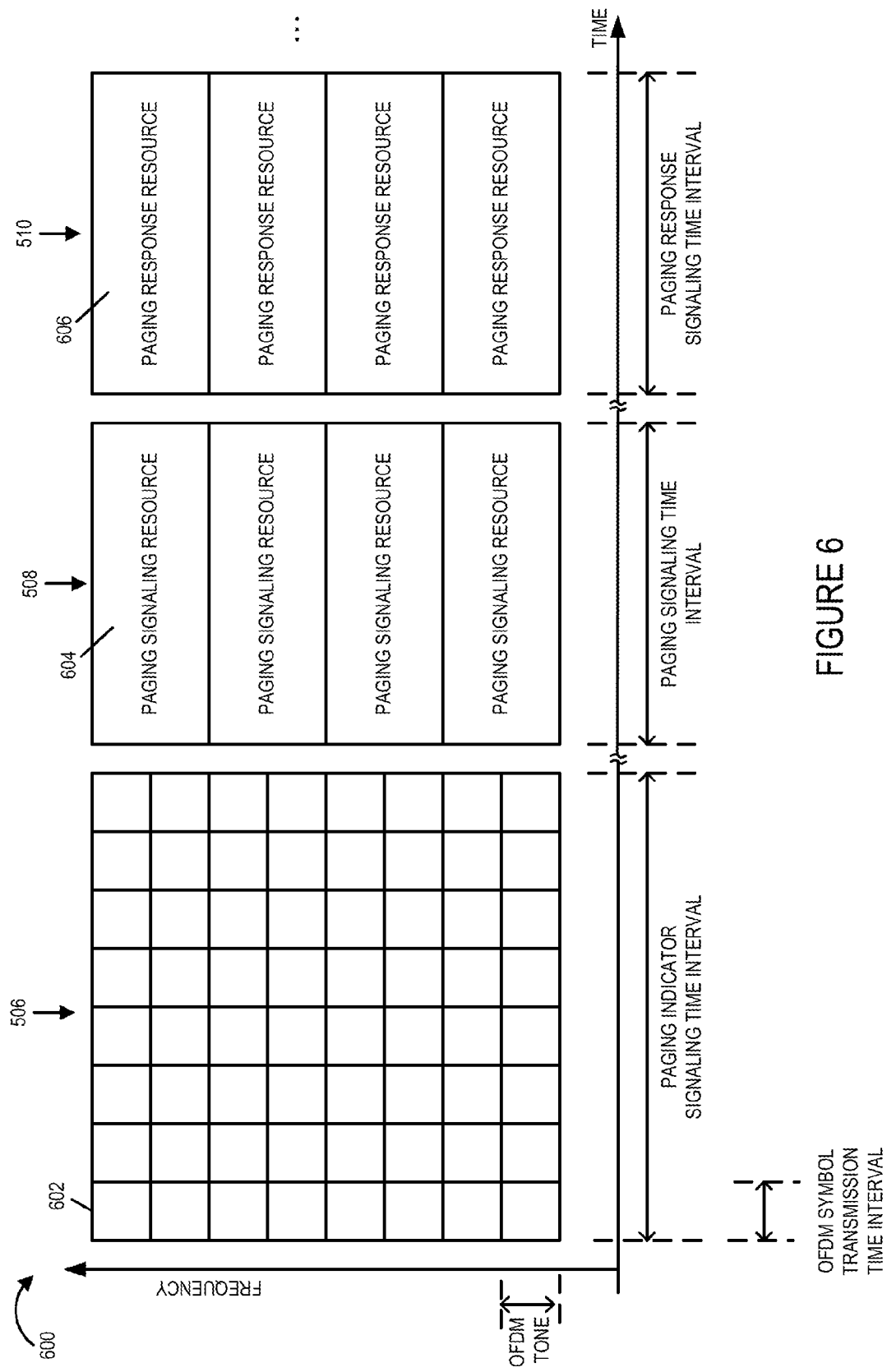
FIG. 6 is a drawing illustrating further partitioning of the exemplary air link resources of FIG. 5 in accordance with an exemplary embodiment.

FIG. 6 is a drawing 600 illustrating further partitioning of the exemplary air link resources of FIG. 5 in accordance with an exemplary embodiment. Paging indicator resource block 506 includes 64 individual paging indicator resources 602, where each individual paging indicator resource is an OFDM tone-symbol. Paging signaling resource block 508 includes four paging signaling resources 604, each paging signaling resource includes multiple OFDM tone-symbols. Paging response resource block 508 includes four paging response resources 606, each paging response resource includes multiple OFDM tone-symbols.

In another exemplary embodiment, there are 56 tones and 8 symbol transmission time intervals in the paging indicator resource block, which corresponds to 448 individual paging indicator resources in the paging indicator resource block, where each individual paging indicator resource is a single OFDM tone-symbol. In one such embodiment, there are 14 paging signaling resources in the paging signaling resource block, and 14 corresponding paging response resources in the paging response resource block.

Figure 7:
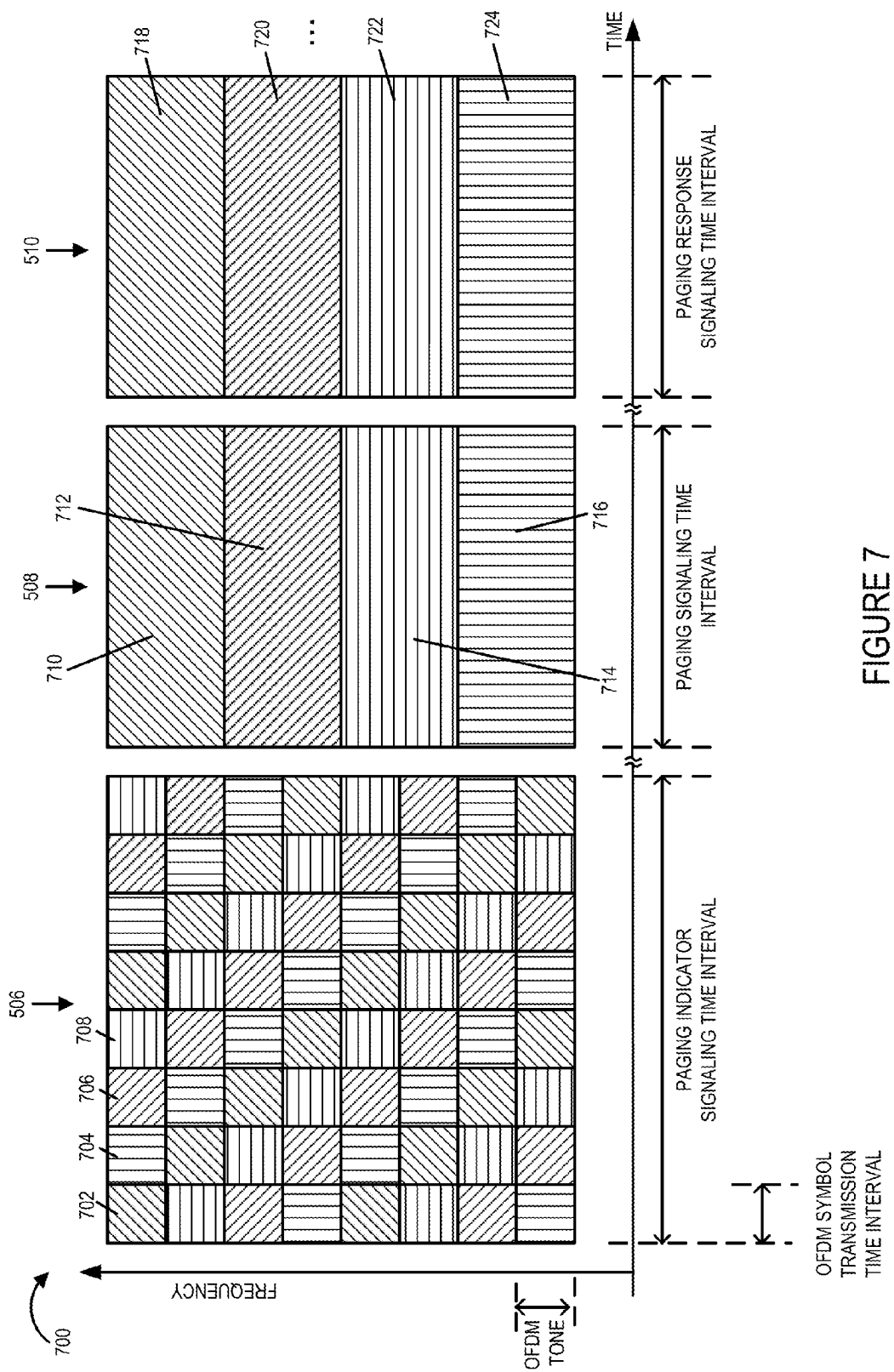
FIG. 7 is a drawing illustrating that a plurality of individual paging indicator resources correspond to the same paging signaling resource, and a paging signaling resource corresponds to a paging response resource, in accordance with some embodiments.

FIG. 7 is a drawing 700 illustrating that a plurality of individual paging indicator resources correspond to the same paging signaling resource, and a paging resource corresponds to a paging response resource. The 16 individual paging indicator resources 702 identified by ascending diagonal line shading from left to right correspond to paging signaling resource 710 and paging response resource 718. The 16 individual paging indicator resources 704 identified by vertical line shading correspond to paging signaling resource 716 and paging response resource 724. The 16 individual paging indicator resources 706 identified by descending diagonal line shading from left to right correspond to paging signaling resource 712 and paging response resource 720. The 16 individual paging indicator resources 708 identified by horizontal line shading correspond to paging signaling resource 714 and paging response resource 722.

Figure 8:
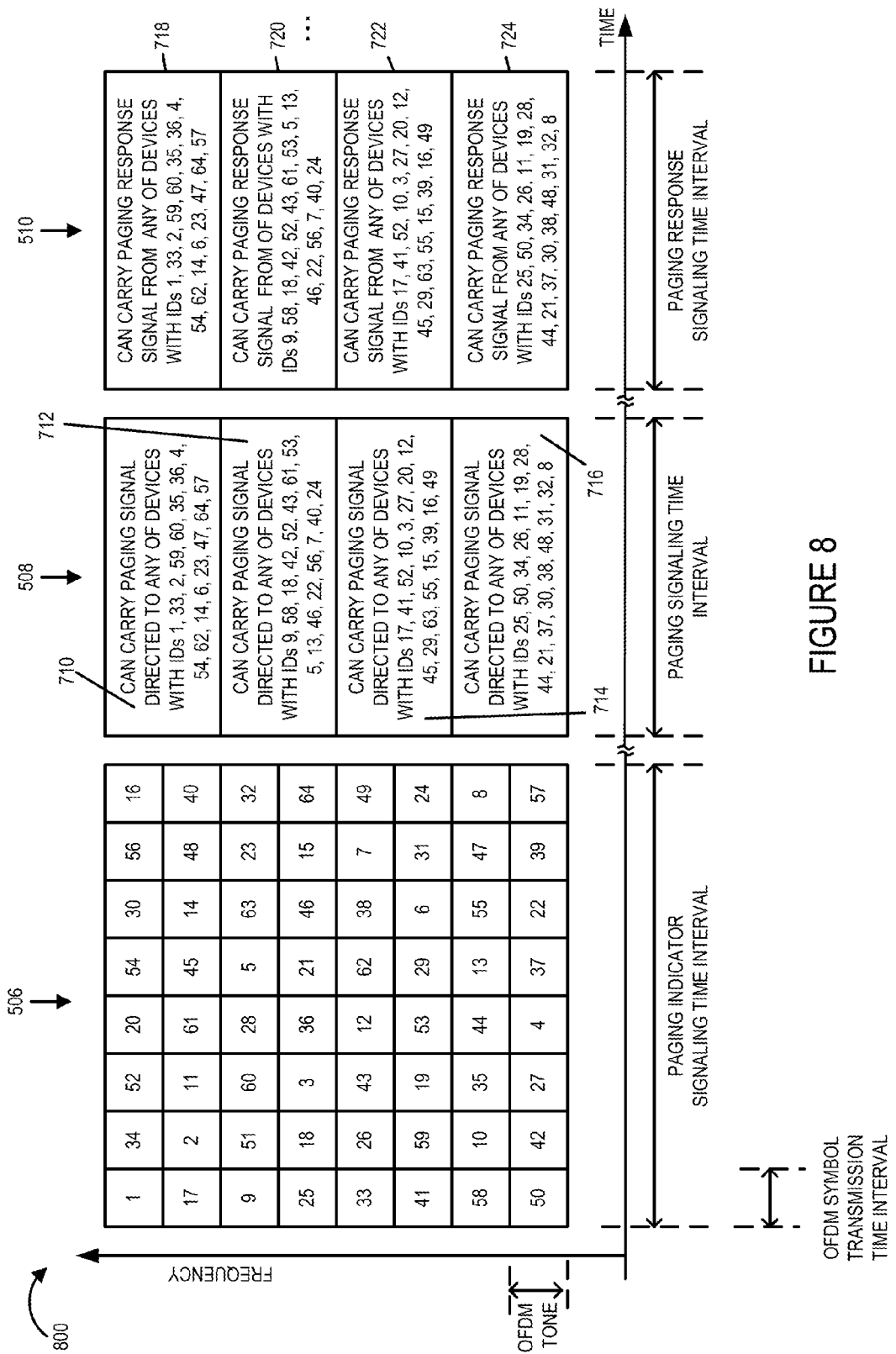
FIG. 8 is a drawing illustrating that each of the paging indicator resources is associated with a device identifier in accordance with some embodiments.

FIG. 8 is a drawing illustrating that each of the paging indicator resources is associated with a device identifier, e.g., a peer discovery device identifier. The 64 individual paging indicator resources of paging indicator resource block 506 are associated with 64 different device identifiers, e.g., in accordance with a predetermined mapping. An individual paging indicator resource can, and sometime does, carry a paging indicator signal directed to the device with the ID corresponding to the resource. In some embodiments, one such ID may, and sometimes does, correspond to multiple devices.

Paging signaling resource 710 can, and sometime does, carry a paging signal directed to any of devices with IDs 1, 33, 2, 59, 60, 35, 36, 4, 54, 62, 14, 6, 23, 47, 64, and 57. Paging signaling resource 710 may, and sometimes does, carry multiple paging signals concurrently. Paging signaling resource 712 can, and sometime does, carry a paging signal directed to any of devices with IDs 9, 58, 18, 42, 52, 43, 61, 53, 5, 13, 46, 22, 56, 7, 40, and 24. Paging signaling resource 712 may, and sometimes does, carry multiple paging signals concurrently. Paging signaling resource 714 can, and sometime does, carry a paging signal directed to any of devices with IDs 17, 41, 52, 10, 3, 27, 20, 12, 45, 29, 63, 55, 15, 39, 16, and 49. Paging signaling resource 714 may, and sometimes does, carry multiple paging signals concurrently. Paging signaling resource 716 can, and sometime does, carry a paging signal directed to any of devices with IDs 25, 50, 34, 26, 11, 19, 28, 44, 21, 37, 30, 38, 48, 31, 32, and 8. Paging signaling resource 716 may, and sometimes does, carry multiple paging signals concurrently.

Paging response resource 718 can, and sometime does, carry a paging response signal from any of devices with IDs 1, 33, 2, 59, 60, 35, 36, 4, 54, 62, 14, 6, 23, 47, 64, and 57. Paging response resource 718 may, and sometimes does, carry multiple paging response signals concurrently. Paging response resource 720 can, and sometime does, carry a paging response signal from any of devices with IDs 9, 58, 18, 42, 52, 43, 61, 53, 5, 13, 46, 22, 56, 7, 40, and 24. Paging response resource 720 may, and sometimes does, carry multiple paging response signals concurrently. Paging response resource 722 can, and sometime does, carry a paging response signal from any of devices with IDs 17, 41, 52, 10, 3, 27, 20, 12, 45, 29, 63, 55, 15, 39, 16, and 49. Paging response resource 722 may, and sometimes does, carry multiple paging response signals concurrently. Paging response resource 724 can, and sometime does, carry a paging response signal from any of devices with IDs 25, 50, 34, 26, 11, 19, 28, 44, 21, 37, 30, 38, 48, 31, 32, and 8. Paging response resource 724 may, and sometimes does, carry multiple paging response signals concurrently.

Figure 9:
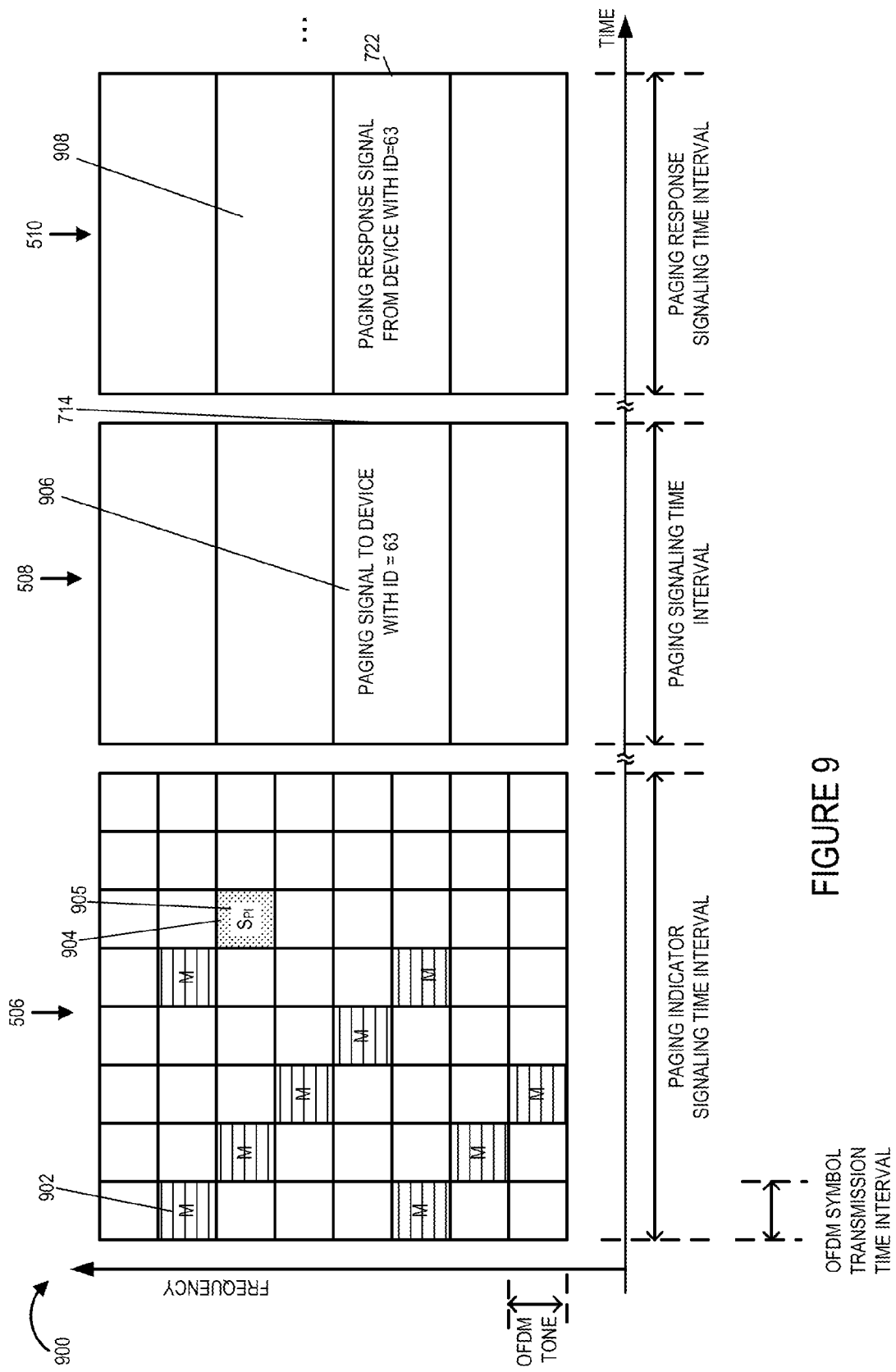
FIG. 9 is a drawing illustrating an example in which a wireless terminal desires to page another wireless terminal in an exemplary peer to peer system using the timing structure illustrated in FIGS. 5-8 and implementing an exemplary method in accordance with FIG. 2.

FIG. 9 is a drawing 900 illustrating an example in which a wireless terminal desires to page another wireless terminal in an exemplary peer to peer system using the timing structure illustrated in FIGS. 5-8. Consider that a wireless terminal, e.g. a wireless terminal currently holding peer discovery device ID 1, desires to page the wireless terminal currently having the peer discovery device ID 63. The wireless terminal which desires to send the page identifies page indicator resource 904 as the page indicator resource that it should use if it decides to send a paging indicator signal. The wireless terminal also identifies that paging signaling resource 714 is the paging signaling resource that it will use if it should send a paging signal to the wireless terminal with ID 63. The wireless terminal with ID 1 monitors a portion of a set of paging indicator resources used to communicate paging indicator signals. The monitored paging indicator resources 902 are indicated by horizontal line shading and an M. The monitored paging indicator resources are those paging indicator resources which correspond to paging signaling resource 714 and which temporally precede paging indicator resource 904 in the paging indicator resource block 506. In this embodiment, there is a notion of priority associated with position in the paging indicator resource block 506, with lower index symbols corresponding to higher priority. Therefore the wireless terminal desiring to send the page, monitors the nine individual paging indicator resources 902, measuring received signal strength and counting a number of paging indicator signals detected on the monitored paging indicator resources. The wireless terminal with ID 1, which desires to send the paging indicator signal, makes a decision whether or not to send the paging indicator signal to the wireless terminal with ID 63, e.g., in accordance with step 226 of flowchart 200.

Consider, that in this example, the wireless terminal with ID 1 decides to send a paging indicator signal. The wireless terminal with ID 1 generates paging indicator signal $S_{PI}$ 905 and transmits it to the wireless terminal with ID 63 using paging indicator resource 904. Subsequently the wireless terminal with ID 1 generates and sends paging signal 906 to the device with ID 63 using paging signaling resource 714. Then, the wireless terminal with ID 63 sends paging response signal 906 to the wireless terminal with device ID 1 which sent the paging signal, using paging response resource 722.

Figures 10, 10A, 10B:
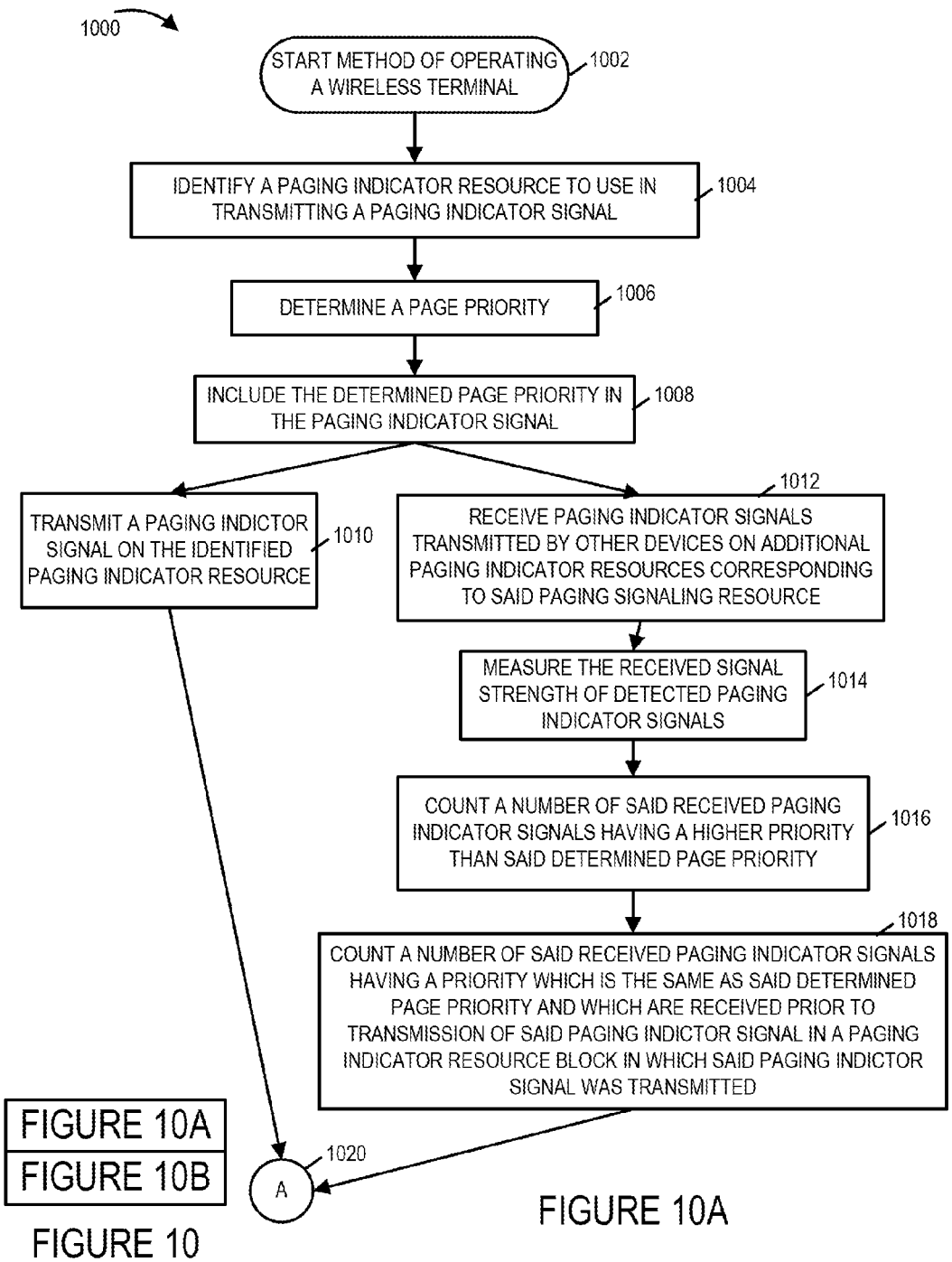
FIG. 10A is a first part of a flowchart of an exemplary method of operating a wireless terminal in accordance with an exemplary embodiment.
FIG. 10B is a second part of a flowchart of an exemplary method of operating a wireless terminal in accordance with an exemplary embodiment.
Figure 10B:
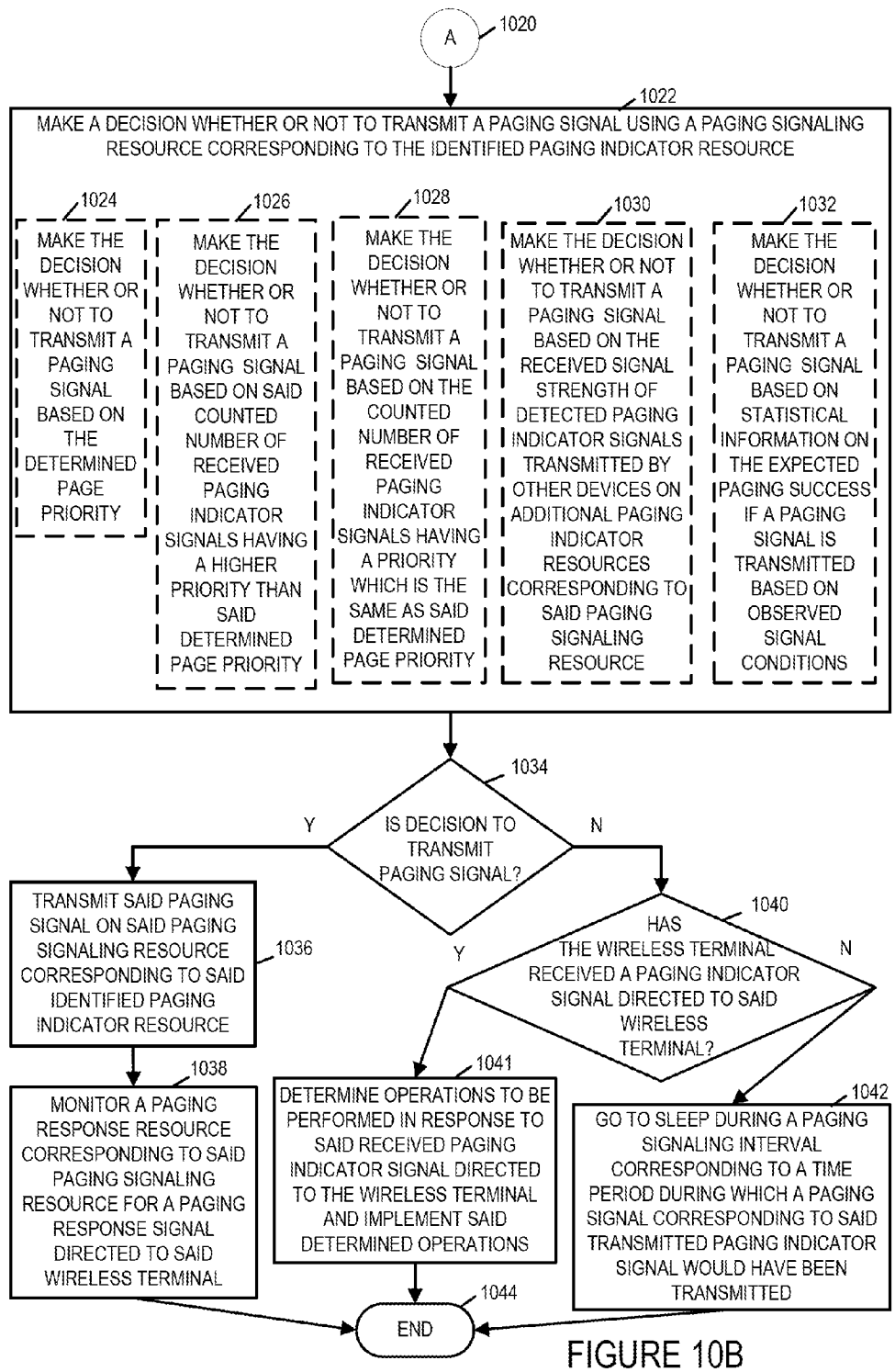

FIG. 10, comprising the combination of FIG. 10A and FIG. 10B, is a flowchart 1000 of an exemplary method of operating a wireless terminal in accordance with an exemplary embodiment. The exemplary wireless terminal is, e.g., one of the wireless communications devices of system 100 of FIG. 1. Operation starts in step 1002, where the wireless terminal is powered on and initialized and proceeds to step 1004.

In step 1004 the wireless terminal identifies a paging indicator resource to use in transmitting a paging indicator signal. In various embodiments, the identified paging indicator resource corresponds to a device to be paged. Operation proceeds from step 1004 to step 1006, in which the wireless terminal determines a page priority. Then, in step 1008 the wireless terminal includes the determined page priority in the paging indicator signal. In some embodiments the paging indicator signal is a two OFDM tone-symbol signal transmitted in a single OFDM symbol transmission time interval. In some embodiments, the paging indicator signal indicates one of four possible paging priorities. Operation proceeds from step 1008 to steps 1010 and 1012.

In step 1010 the wireless terminal transmits a paging indicator signal on the identified paging indicator resource. In step 1012 the wireless terminal receives paging indicator signals transmitted by other devices on additional paging indicator resources corresponding to said paging resource. Operation proceeds from step 1012 to step 1014 in which the wireless terminal measures the received signal strength of the detected paging indicator signals. Operation proceeds from step 1014 to step 1016, in which the wireless terminal counts a number of said received paging indicator signals having a higher priority than said determined page priority. Operation proceeds from step 1016 to step 1018, in which the wireless terminal counts a number of said received paging indicator signals having a priority which is the same as said determined page priority and which are received prior to transmission of said paging indictor signal in a paging indicator resource block in which said paging indicator signal was received.

In some embodiments, step 1010 is performed during one symbol transmission time interval of a paging indicator resource block and step 1012 is performed during one or more different symbol transmission time intervals of the same paging indicator resource block. Operation proceeds from step 1010 and step 1018 via connecting node A 1020 to step 1022.

In step 1022 the wireless terminal makes a decision whether or not to transmit a paging signal using a paging signal resource corresponding to the identified paging indicator signal resource. In various embodiments, step 1022 includes one or more or all of steps 1024, 1026, 1028, 1030, and 1032. In step 1024 the wireless terminal makes the decision whether or not to transmit a paging signal based on the determined page priority. In step 1026 the wireless terminal makes the decision whether or not to transmit a paging signal based on said counted number of received paging indicator signals having a higher priority than said determined page priority, e.g., the count of step 1016. In step 1028 the wireless terminal makes the decision whether or not to transmit a paging signal based on the counted number of received paging indicator signals having a priority which is the same as said determined priority, e.g., the count of step 1018. In step 1030 the wireless terminal makes the decision whether or not to transmit a paging signal based on the received signal strength of detected paging indicator signals transmitted by devices on additional paging indicator resources corresponding to said paging signaling resource, e.g., based on measurements of step 1014. In step 1032 the wireless terminal makes the decision whether or not to transmit a page based on statistical information on the expected paging success if a paging signal is transmitted based on observed signal condition. In various embodiments, one or more or all of steps 1024, 1026, 1028, 1030, and 1032 are performed in coordination to make a decision.

Operation proceeds from step 1022 to step 1034. In step 1034 the wireless terminal controls operation as a function of the decision of step 1022. If the decision of step 1022 is to transmit a paging signal, then operation proceeds from step 1034 to step 1036; otherwise, operation proceeds from step 1034 to step 1040.

Returning to step 1036, in step 1036 the wireless terminal transmits the paging signal on said paging signaling resource corresponding to said identified paging indicator resource. Then, in step 1038 the wireless terminal monitors a paging response resource corresponding to said paging signaling resource for a paging response signal directed to said wireless terminal. Operation proceeds from step 1038 to end step 1044.

Returning to step 1040, in step 1040 the wireless terminal determines if the wireless terminal has received a paging indicator signal directed to the wireless terminal. If the wireless terminal has received a paging indicator signal directed to the wireless terminal, then operation proceeds from step 1040 to step 1041, in which the wireless terminal determines operations to be performed in response to said received paging indicator signal directed to the wireless terminal and implements said determined operations. Operation proceeds from step 1041 to end step 1044. Various exemplary operations which may be performed in step 1041 include one or more of: deciding whether or not to monitor for a paging signaling directed to the wireless terminal, receiving a paging signal directed to the wireless terminal, deciding whether or not to transmit a paging response signal to the device which transmitted the paging signal to the wireless terminal, generating a paging response signal, transmitting a paging response signal, and controlling the device to go to sleep.

Returning to step 1040, if the wireless terminal has not received a paging indicator signal directed to the wireless terminal, then operation proceeds from step 1040 to step 1042, in which the wireless terminal goes to sleep during a paging signaling interval corresponding to a time period during which a paging signal corresponding to said transmitted paging indicator signal would have been transmitted. Operation proceeds from step 1042 to end step 1044.

Figure 11:
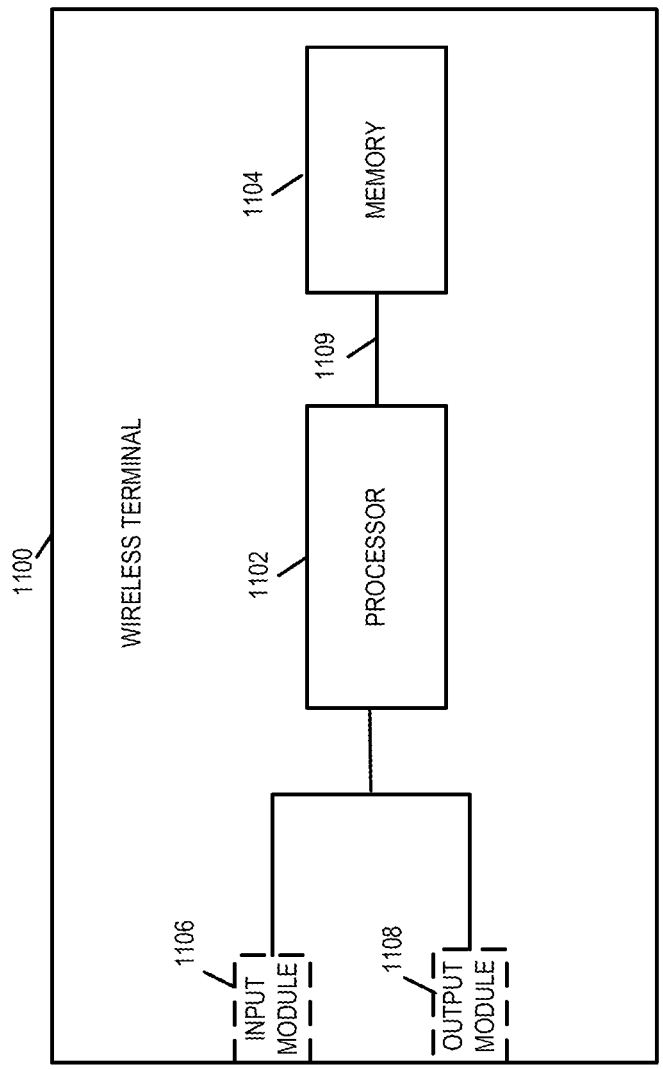
FIG. 11 is a drawing of an exemplary wireless terminal, in accordance with an exemplary embodiment.

FIG. 11 is a drawing of an exemplary wireless terminal 1100, in accordance with an exemplary embodiment. Exemplary wireless terminal 1100 is, e.g., one of the wireless communications devices of FIG. 1. Exemplary wireless terminal 1100 may, and sometimes does, implement a method in accordance with flowchart 1000 of FIG. 10.

Wireless terminal 1100 includes a processor 1102 and memory 1104 coupled together via a bus 1109 over which the various elements (1102, 1104) may interchange data and information. Wireless terminal 1100 further includes an input module 1106 and an output module 1108 which may be coupled to processor 1102 as shown. However, in some embodiments, the input module 1106 and output module 1108 are located internal to the processor 1102. Input module 1106 can receive input signals. Input module 1106 can, and in some embodiments does, include a wireless receiver and/or a wired or optical input interface for receiving input. Output module 1108 may include, and in some embodiments does include, a wireless transmitter and/or a wired or optical output interface for transmitting output.

Processor 1102 is configured to: identify a paging indicator resource to use in transmitting a paging indicator signal; transmit a paging indicator signal on the identified paging indicator resource; and make a decision whether or not to transmit a paging signal using a paging signaling resource corresponding to said identified paging indicator resource. In various embodiments, said identified paging indicator resource corresponds to a device to be paged. In various embodiments, processor is further configured to: determine a page priority; and include the determined page priority in the paging indicator signal.

In some embodiments, the paging indicator signal is a two OFDM tone symbol signal transmitted in a single OFDM symbol transmission time interval. In various embodiments, said paging indicator signal indicates one of four possible paging priorities.

Processor 1102 is, in some embodiments, configured to base the decision whether or not to transmit a paging signal on the determined page priority, as part of being configured to make a decision whether or not to transmit said paging signal. In some such embodiments, processor 1102 is further configured to: receive paging indicator signals transmitted by other devices on additional paging indicator resources corresponding to said paging signaling resource, and count a number of said received paging indicator signals having a higher priority than said determined page priority; and processor 1102 is configured to base the decision whether or not to transmit a paging signal on said counted number of received paging indicator signals having a higher priority than said determined page priority, as part of being configured to make a decision whether or not to transmit a paging signal.

In various embodiments, processor 1102 is further configured to: receive paging indicator signals transmitted by other devices on additional paging indicator resources corresponding to said paging signaling resource and count a number of said received paging indicator signals having a priority which is the same as said determined page priority and which are received prior to transmission of said paging indicator signal in a paging indicator resource block in which said paging indicator signal is transmitted. In some such embodiments, processor 1102 is configured to base the decision whether or not to transmit a paging signal on said counted number of received paging indicator signals having a priority which is the same as said determined page priority, as part of being configured to decide whether or not to transmit a paging signal.

In some embodiments, processor 1102 is further configured to: receive paging indicator signals transmitted by other devices on additional paging indicator resources corresponding to said paging signaling resource. In some such embodiments, processor 1102 is configured to base the decision whether or not to transmit a paging signal on the received signal strength of detected paging indicator signals transmitted by other devices on additional paging indicator resources corresponding to said paging signaling resource, as part of being configured to decide whether or not to transmit a paging signal. Processor 1102 is, in some embodiments, configured to base the decision whether or not to transmit a paging signal on statistical information on the expected paging success if a paging signal is transmitted based on observed signal conditions, as part of being configured to decide whether or not to transmit a paging signal.

In various embodiments, processor 1102 is further configured to: i) transmit said paging signal on said paging signaling resource corresponding to said identified paging indicator resource; and ii) monitoring a paging response resource corresponding to said paging signaling resource for a paging response signal directed to said wireless terminal, when decision whether or not to transmit a paging signal is a decision to transmit a paging signal. In some embodiments, processor 1102 is further configured to: control said wireless terminal to go to sleep during a paging signaling interval corresponding to a time period during which a paging signal corresponding to said transmitted page indicator signal would have been transmitted, when said decision whether or not to transmit a paging signal is a decision not to transmit a paging signal and said wireless terminal has not received a paging indicator signal directed to said wireless terminal.

Figures 12, 12A:
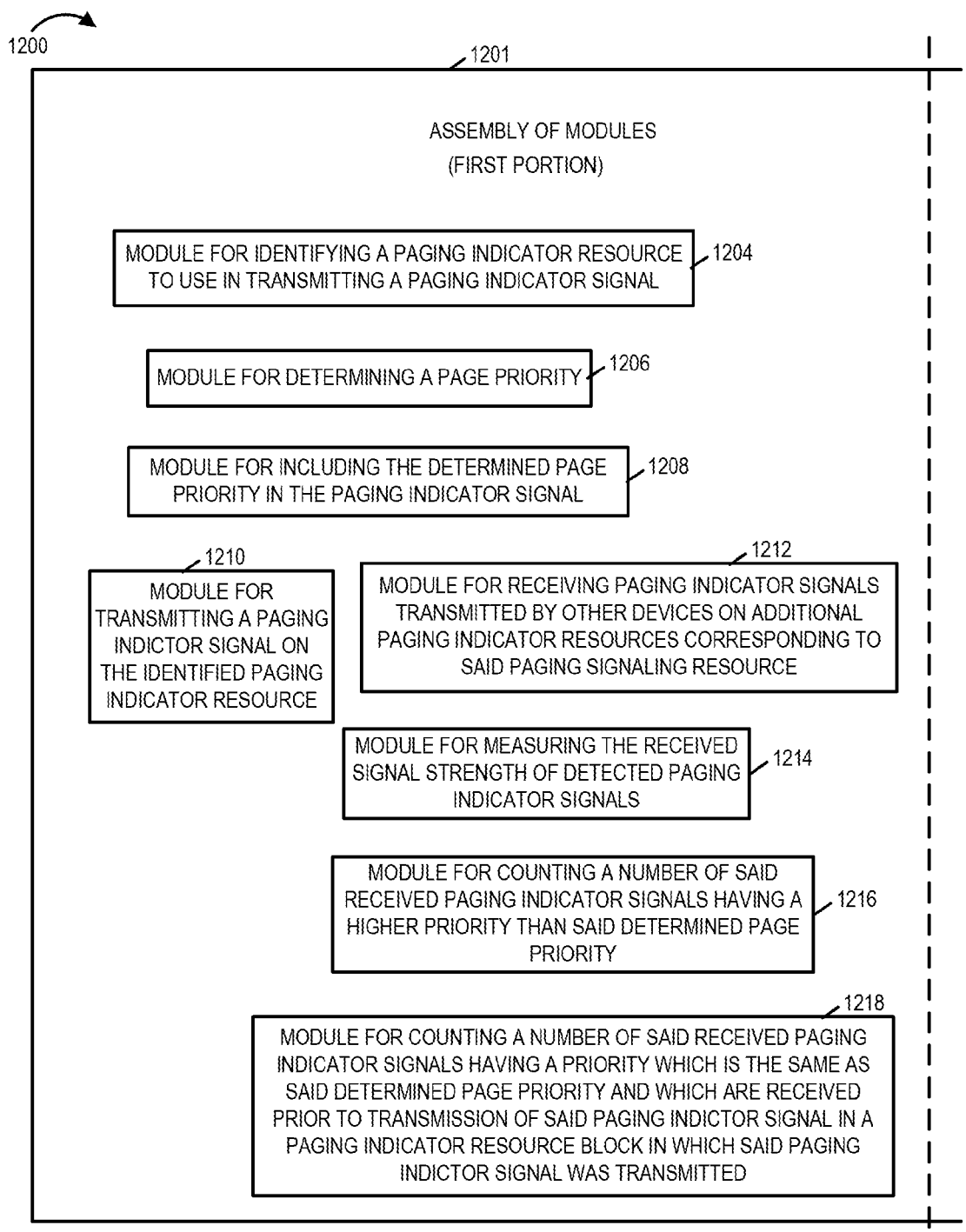
FIG. 12A is a first portion of an assembly of modules which can, and in some embodiments is, used in the wireless terminal illustrated in FIG. 11.
Figure 12B:
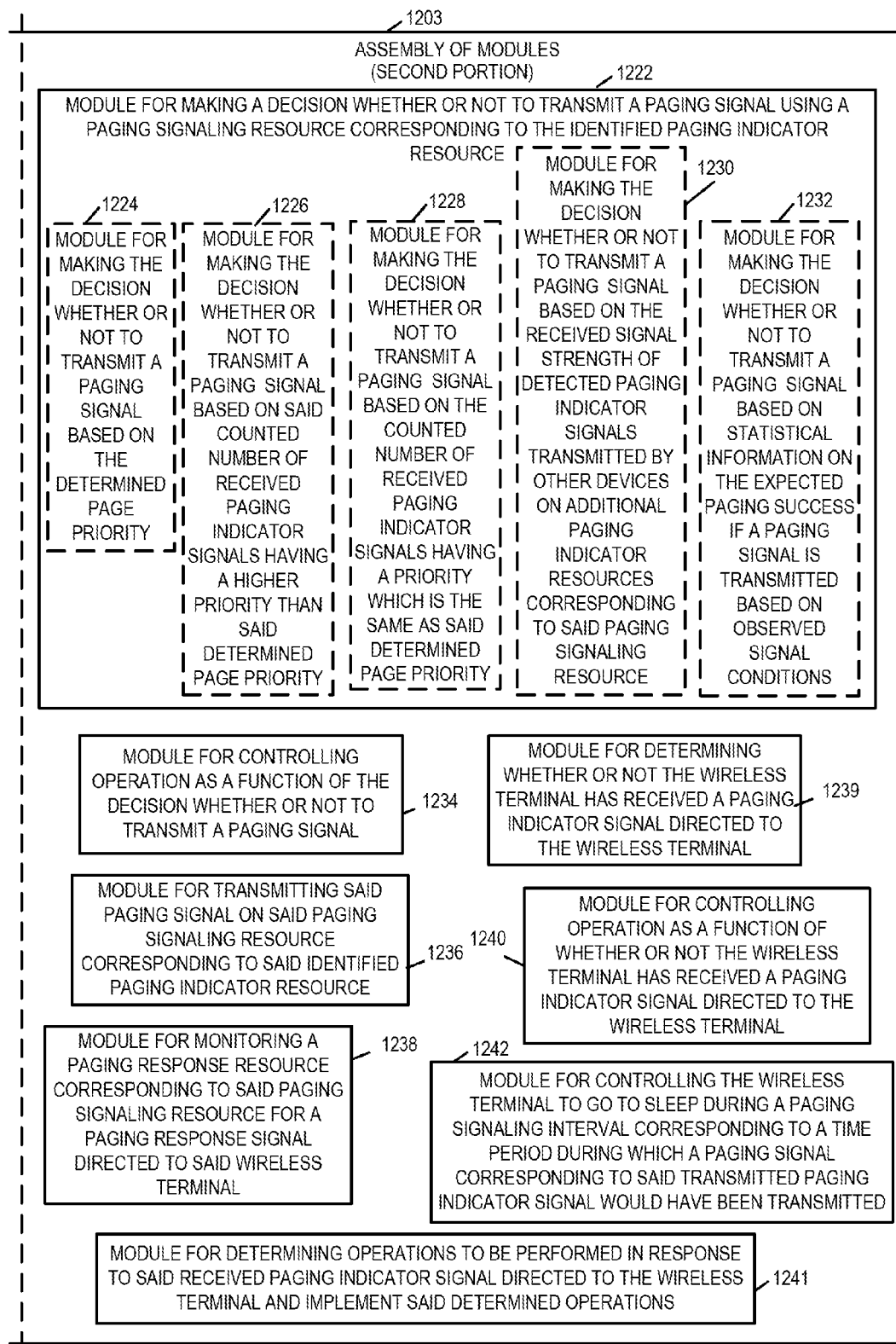
FIG. 12B is a second portion of an assembly of modules which can, and in some embodiments is, used in the wireless terminal illustrated in FIG. 11.

FIG. 12, comprising the combination of FIG. 12A and FIG. 12B is an assembly of modules 1200 which can, and in some embodiments is, used in the wireless terminal 1100 illustrated in FIG. 11. Assembly of modules 1200 includes portion 1201 and portion 1203. The modules in the assembly 1200 can be implemented in hardware within the processor 1102 of FIG. 11, e.g., as individual circuits. Alternatively, the modules may be implemented in software and stored in the memory 1104 of the wireless terminal 1100 shown in FIG. 11. While shown in the FIG. 11 embodiment as a single processor, e.g., computer, it should be appreciated that the processor 1102 may be implemented as one or more processors, e.g., computers.

When implemented in software the modules include code, which when executed by the processor, configure the processor, e.g., computer, 1102 to implement the function corresponding to the module. In some embodiments, processor 1102 is configured to implement each of the modules of the assembly of modules 1200. In embodiments where the assembly of modules 1200 is stored in the memory 1104, the memory 1104 is a computer program product comprising a computer readable medium comprising code, e.g., individual code for each module, for causing at least one computer, e.g., processor 1102, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 12 control and/or configure the wireless terminal 1100 or elements therein such as the processor 1102, to perform the functions of the corresponding steps illustrated and/or described in the method of flowchart 1000 of FIG. 10.

Assembly of modules 1200 includes a first portion 1201 and a second portion 1203. Assembly of modules 1200 includes a module 1204 for identifying a paging indicator resource to use in transmitting a paging indicator signal, a module 1206 for determining a page priority, a module 1208 for including the determined page priority in the paging indicator signal, and a module 1210 for transmitting a paging indicator signal on the identified paging indicator resource.

Assembly of modules 1200 further includes a module 1212 for receiving paging indicator signals transmitted by other devices on additional paging indicator resources corresponding to said paging signaling resource, a module 1214 for measuring the received signal strength of detected paging indicator signals, a module 1216 for counting a number of said received paging indicator signal having a higher priority than said determined page priority, and a module 1218 for counting a number of said received paging indictor signals having a priority which is the same as said determined page priority and which are received prior to transmission of said paging indicator signal in a paging indicator resource block in which said paging indicator signal was transmitted.

Assembly of modules 1200 further includes a module 1222 for making a decision whether or not to transmit a paging signal using a paging signaling resource corresponding to the identified paging indicator resource, a module 1234 for controlling operation as a function of the decision whether or not to transmit a paging signal, a module for transmitting said paging signal on said paging signaling resource corresponding to said identified paging indicator resource, a module 1238 for monitoring a paging response resource corresponding to said paging signaling resource for a paging response signal directed to said wireless terminal, a module 1239 for determining whether or not the wireless terminal has received a paging indictor signal directed to the wireless terminal, a module 1240 for controlling operation as a function of whether or not the wireless terminal has received a paging indicator signal directed to the wireless terminal, a module 1241 for determining operations to be performed in response to said received paging indicator signal directed to the wireless terminal and for implementing said determined operations, and a module 1242 for controlling the wireless terminal to go to sleep during a paging signal interval corresponding to a time period during which a paging signal corresponding to said transmitted paging indictor signal would have been transmitted. Assembly of modules 1222, in various embodiments, includes one or more or all of: a module 1224 for making the decision whether or not to transmit a paging signal based on the determined page priority, a module 1226 for making the decision whether or not to transmit a paging signal based on said counted number of received paging indicator signal having a higher priority than said determined page priority, a module 1228 for making the decision whether or not to transmit a paging signal based on the counted number of received paging indicator signals having a priority which is the same as said determined priority and which are received prior to transmission of said paging indicator signal in a paging indicator resource block in which said paging indicator signal was transmitted, a module 1230 for making the decision whether or not to transmit a paging indicator signal based on the received signal strength of detected paging indicator signals transmitted by devices on additional paging indicator resources corresponding to said paging signaling resource, and a module 1232 for making the decision whether or not to transmit a paging signal based on statistical information on the expected paging success of a paging signal is transmitted based on observed conditions.

In some embodiments, the identified paging indicator resource of module 1204 corresponds to a device to be paged. In various embodiments, a paging indicator signal is a two OFDM tone-symbol signal transmitted in a single OFDM symbol transmission time interval. In some embodiments, a paging indicator signal indicates one of four possible paging priorities.

Figure 13:
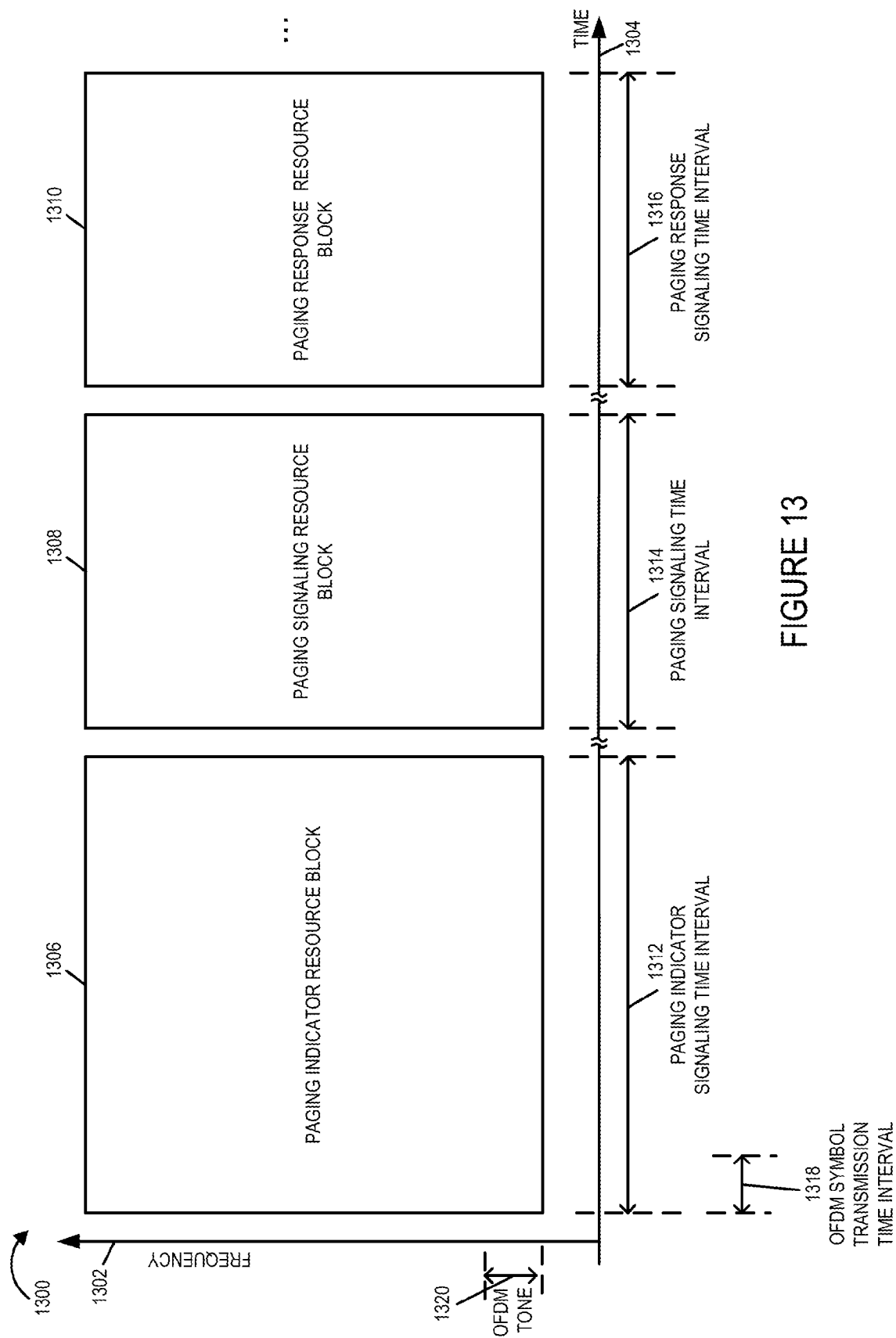
FIG. 13 is a drawing illustrating a portion of an exemplary peer to peer recurring timing structure in accordance with some embodiments.

FIG. 13 is a drawing 1300 illustrating a portion of an exemplary peer to peer recurring timing structure which may be used in some embodiments, e.g., an embodiment implementing a method in accordance with flowchart 1000 of FIG. 10, a wireless terminal 1100 of FIG. 11 and/or an assembly of modules 1200 of FIG. 12. Vertical axis 1302 represents frequency and includes a plurality of OFDM tones 1320. The horizontal axis 1304 represents time and includes a plurality of OFDM symbol transmission time intervals. The exemplary peer to peer air link resources includes a paging indicator resource block 1306, a corresponding paging signaling resource block 1308, and a corresponding paging response resource block 1310, which occur during a paging indicator signaling time interval 1312, a paging signaling time interval 1314, and a paging response signaling time interval 1316, respectively.

Figure 14:
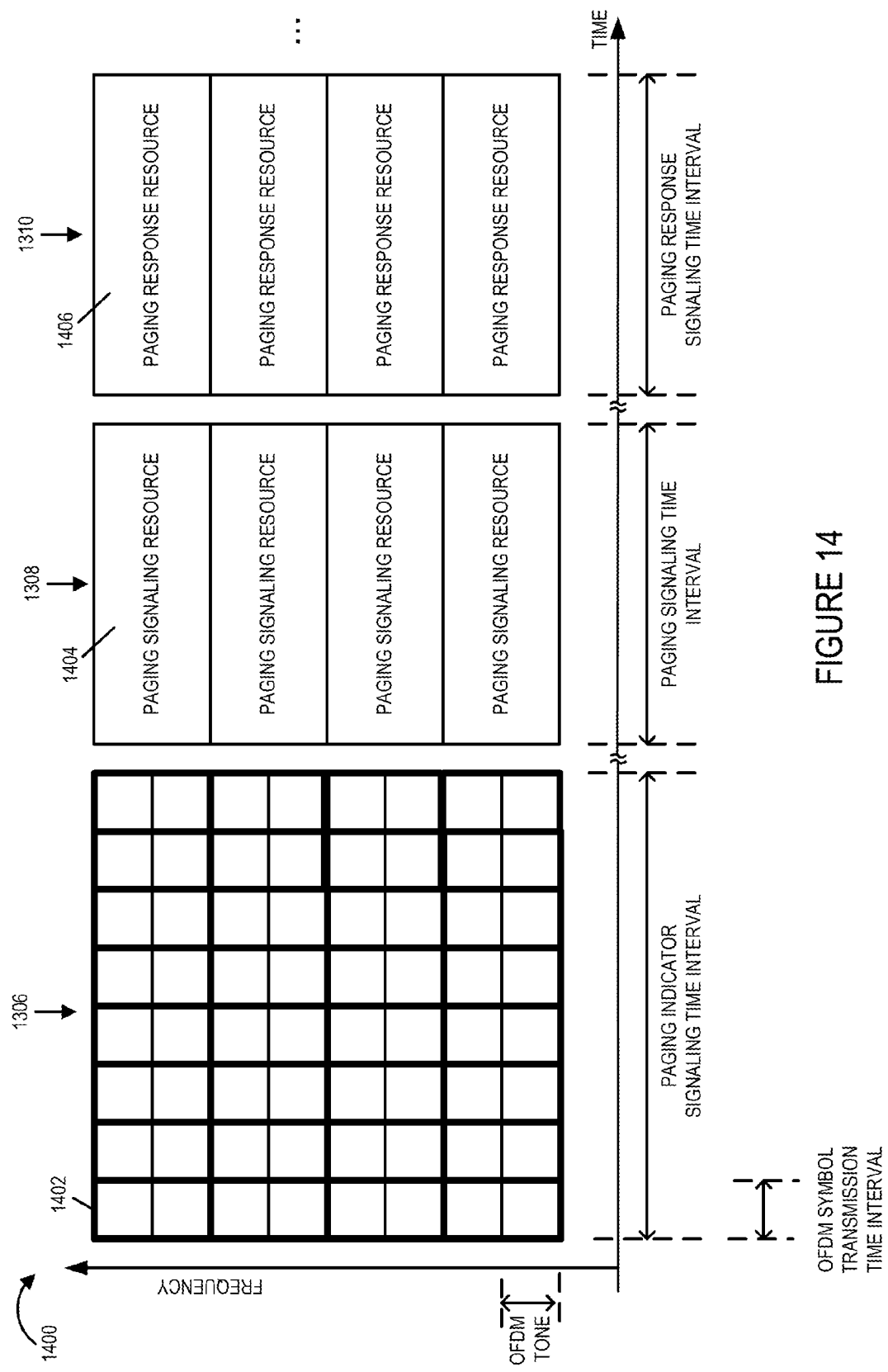
FIG. 14 is a drawing illustrating further partitioning of the exemplary air link resources of FIG. 13 in accordance with an exemplary embodiment.

FIG. 14 is a drawing 1400 illustrating further partitioning of the exemplary air link resources of FIG. 13 in accordance with an exemplary embodiment. Paging indicator resource block 1306 includes 32 individual paging indicator resources 1402, where each individual paging indicator resource is two adjacent OFDM tone-symbols in the same symbol transmission time interval. Paging signaling resource block 1308 includes four paging signaling resources 1404, each paging signaling resource includes multiple OFDM tone-symbols. Paging response resource block 1310 includes four paging response resources 1406, each paging response resource includes multiple OFDM tone-symbols.

Figure 15:
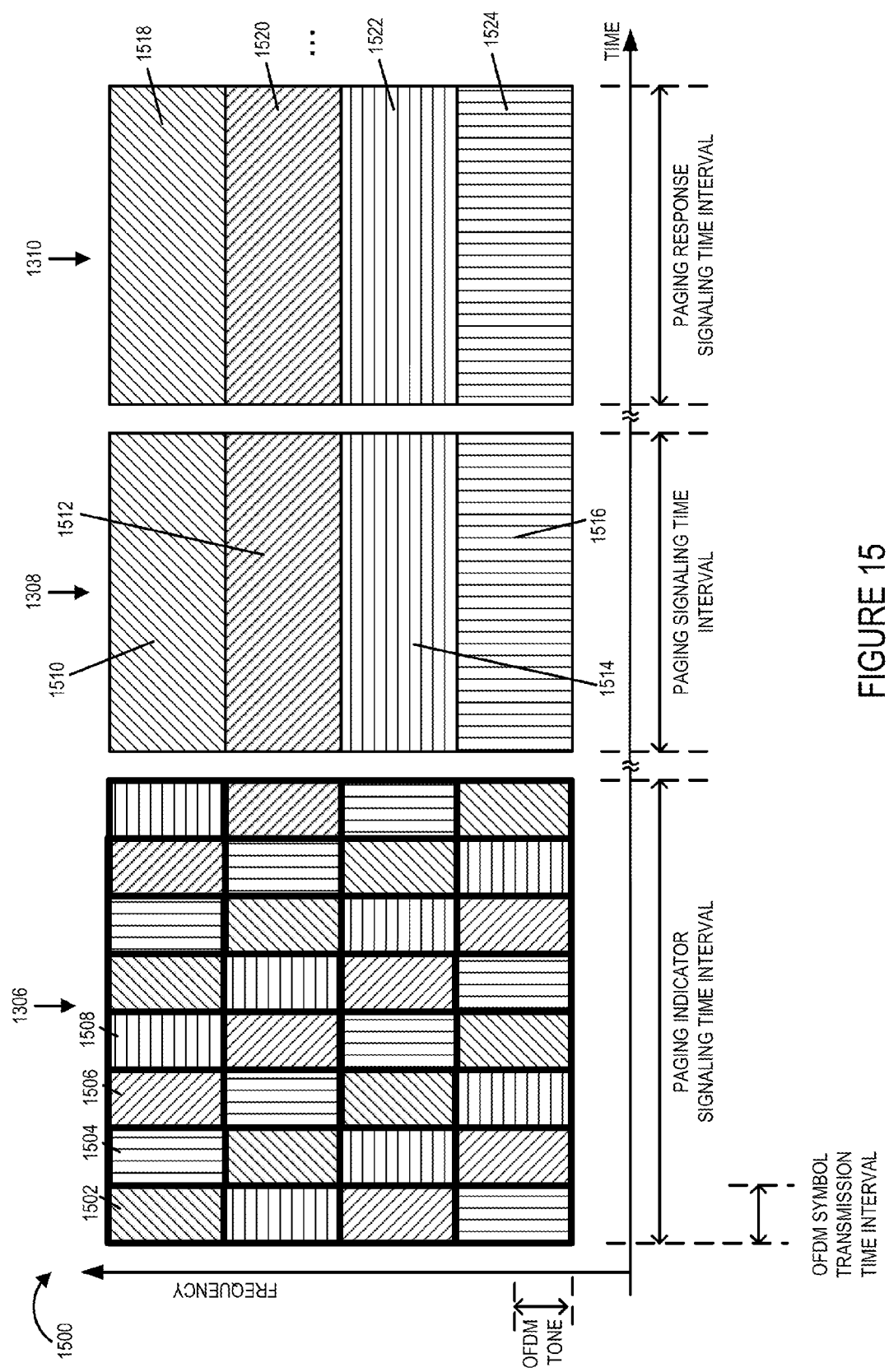
FIG. 15 is a drawing illustrating that a plurality of individual paging indicator resources correspond to the same paging signaling resource, and a paging signaling resource corresponds to a paging response resource, in accordance with some embodiments.

FIG. 15 is a drawing 1500 illustrating that a plurality of individual paging indicator resources corresponds to the same paging signaling resource, and a paging resource corresponds to a paging response resource. The 8 individual paging indicator resources 1502 identified by ascending diagonal line shading from left to right correspond to paging signaling resource 1510 and paging response resource 1518. The 8 individual paging indicator resources 1504 identified by vertical line shading correspond to paging signaling resource 1516 and paging response resource 1524. The 8 individual paging indicator resources 1506 identified by descending diagonal line shading from left to right correspond to paging signaling resource 1512 and paging response resource 1520. The 8 individual paging indicator resources 1508 identified by horizontal line shading correspond to paging signaling resource 1514 and paging response resource 1522.

Figure 16:
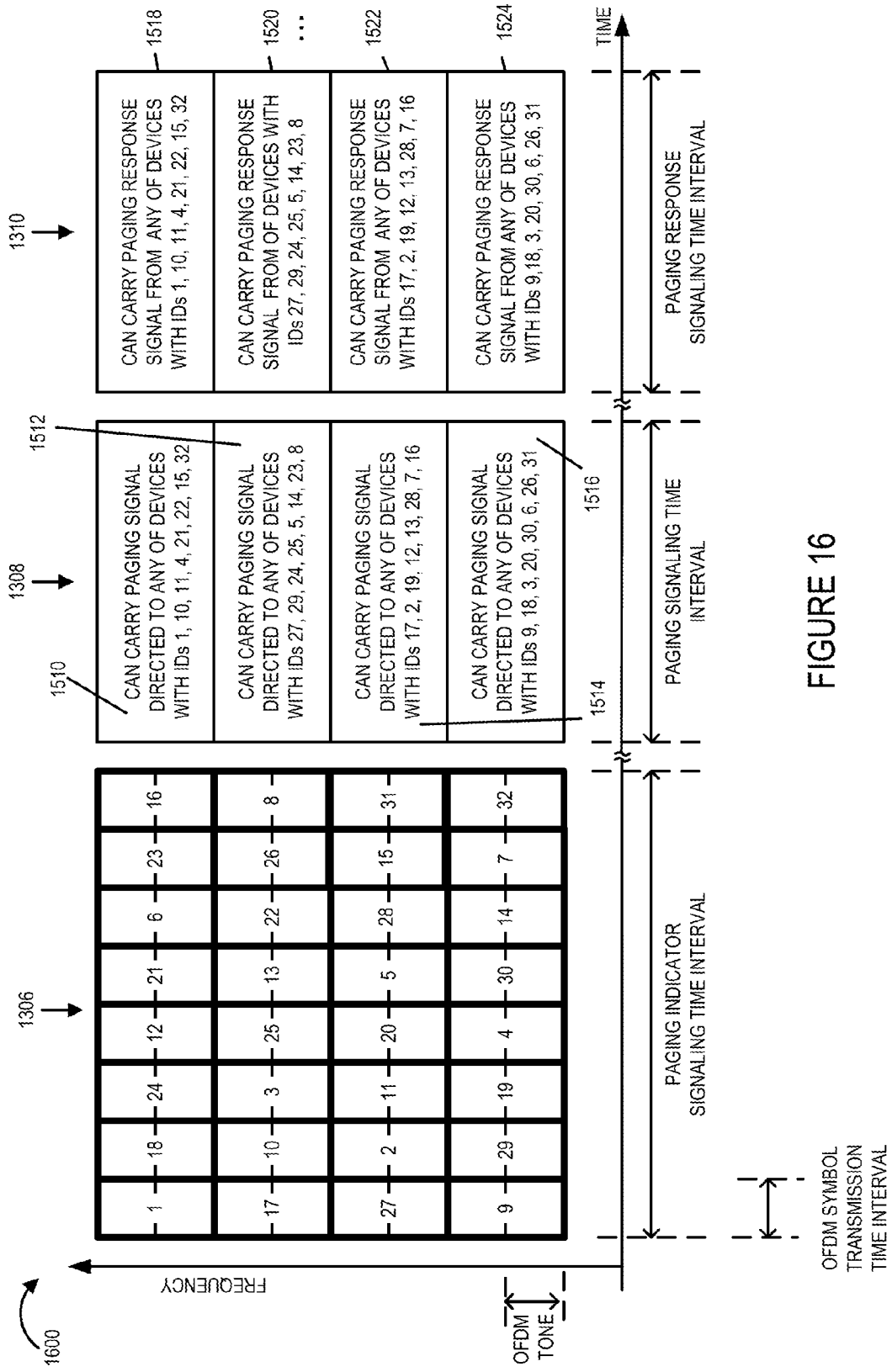
FIG. 16 is a drawing illustrating that each of the paging indicator resources is associated with a device identifier in accordance with some embodiments.

FIG. 16 is a drawing illustrating that each of the paging indicator resources is associated with a device identifier, e.g., a peer discovery device identifier. In some embodiments, each of the paging indicator resources can be, and sometimes is associated with multiple device identifiers. The 32 individual paging indicator resources of paging indicator resource block 1306 are associated with 32 different device identifiers, e.g., in accordance with a predetermined mapping. An individual paging indicator resource can, and sometime does, carry a paging indicator signal directed to the device with the ID corresponding to the resource. In this exemplary embodiment, prior to transmitting a paging indicator signal the wireless terminal, intending to transmit the paging indicator signals, determines a page priority, e.g., one of four possible paging priority levels, and includes the determined page priority in the paging indicator signal.

Paging signaling resource 1510 can, and sometime does, carry a paging signal directed to any of devices with IDs 1, 10, 11, 4, 21, 22, 15, and 32. Paging signaling resource 1510 may, and sometimes does, carry multiple paging signals concurrently. Paging signaling resource 1512 can, and sometime does, carry a paging signal directed to any of devices with IDs 27, 29, 24, 25, 5, 14, 23, and 8. Paging signaling resource 1512 may, and sometimes does, carry multiple paging signals concurrently. Paging signaling resource 1514 can, and sometime does, carry a paging signal directed to any of devices with IDs 17, 2, 19, 12, 13, 28, 7, and 16. Paging signaling resource 1514 may, and sometimes does, carry multiple paging signals concurrently. Paging signaling resource 1516 can, and sometime does, carry a paging signal directed to any of devices with IDs 9, 18, 3, 20, 30, 6, 26, and 31. Paging signaling resource 1516 may, and sometimes does, carry multiple paging signals concurrently.

Paging response resource 1518 can, and sometime does, carry a paging response signal from any of devices with IDs 1, 10, 11, 4, 21, 22, 15 and 32. Paging response resource 1518 may, and sometimes does, carry multiple paging response signals concurrently. Paging response resource 1520 can, and sometime does, carry a paging response signal from any of devices with IDs 27, 29, 24, 25, 5, 14, 23 and 8. Paging response resource 1520 may, and sometimes does, carry multiple paging response signals concurrently. Paging response resource 1522 can, and sometime does, carry a paging response signal from any of devices with IDs 17, 2, 19, 12, 13, 28, 7 and 16. Paging response resource 1522 may, and sometimes does, carry multiple paging response signals concurrently. Paging response resource 1524 can, and sometime does, carry a paging response signal from any of devices with IDs 9, 18, 3, 20, 30, 6, 26 and 31. Paging response resource 1524 may, and sometimes does, carry multiple paging response signals concurrently.

Figure 17:
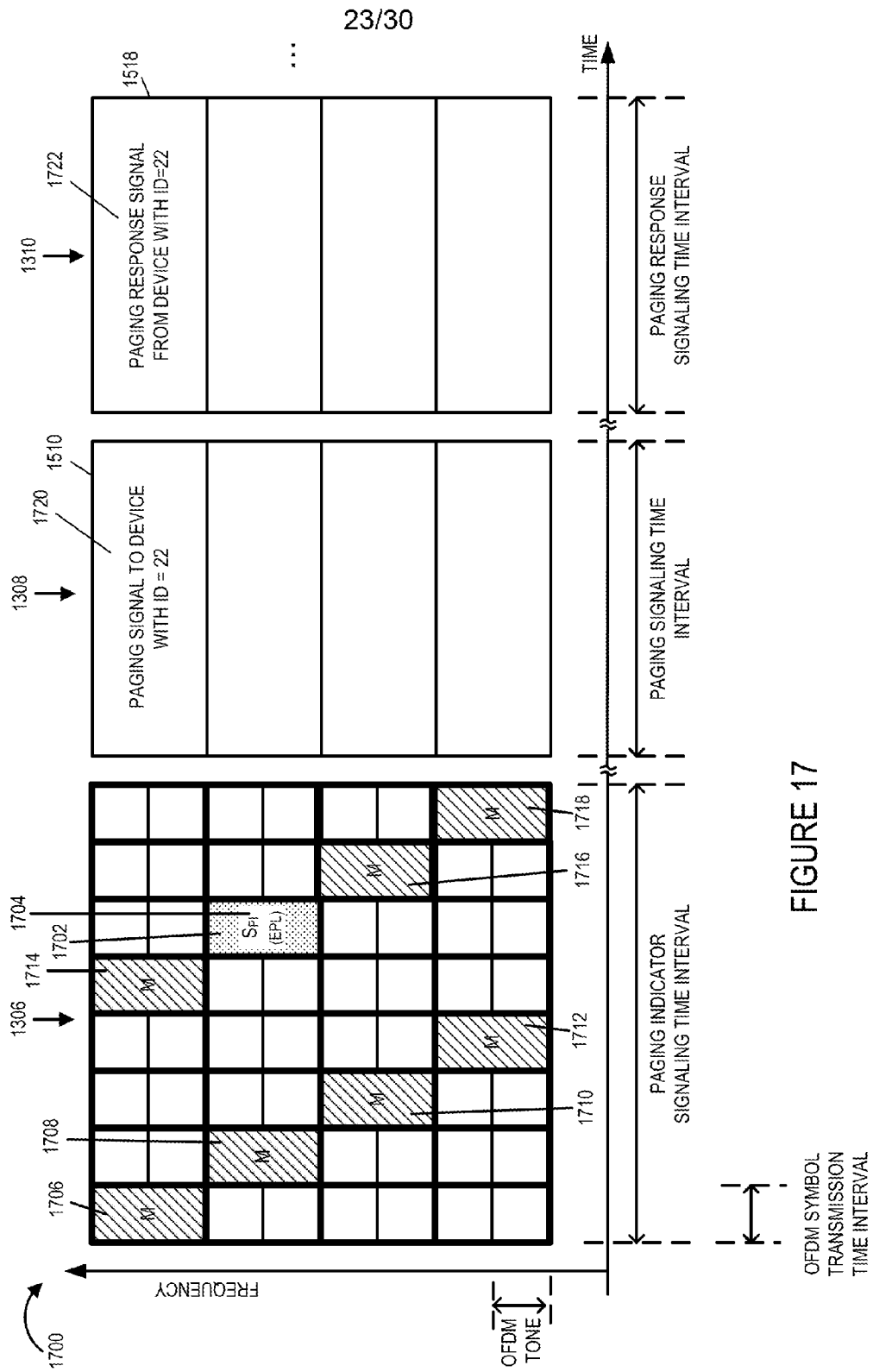
FIG. 17 is a drawing illustrating an example in which a wireless terminal desires to page another wireless terminal in an exemplary peer to peer system using the timing structure illustrated in FIGS. 14-16 and implementing an exemplary method in accordance with FIG. 10.
Figure 18A:
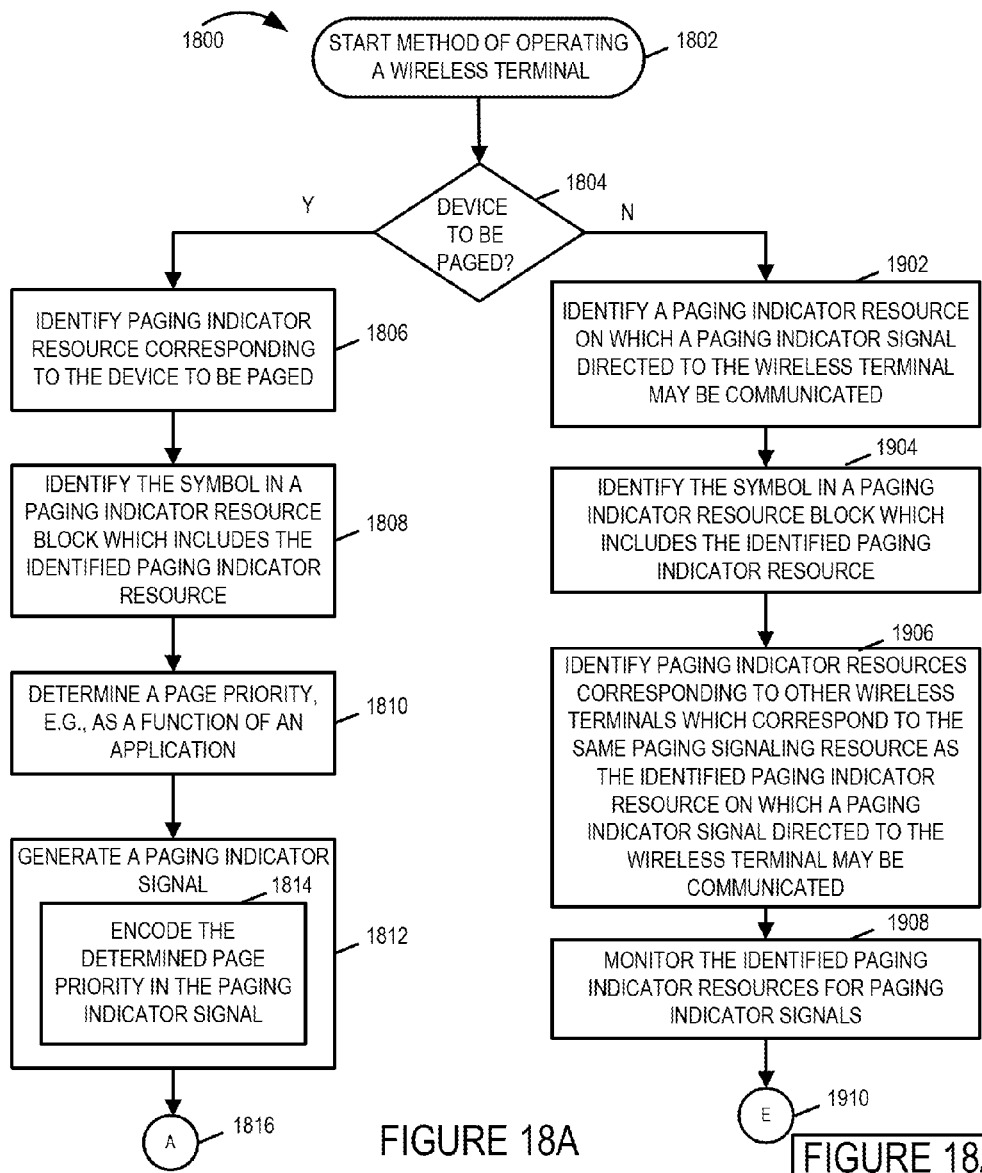
FIG. 18A is a first part of a flowchart of an exemplary method of operating a wireless terminal in accordance with an exemplary embodiment.
Figure 18B:
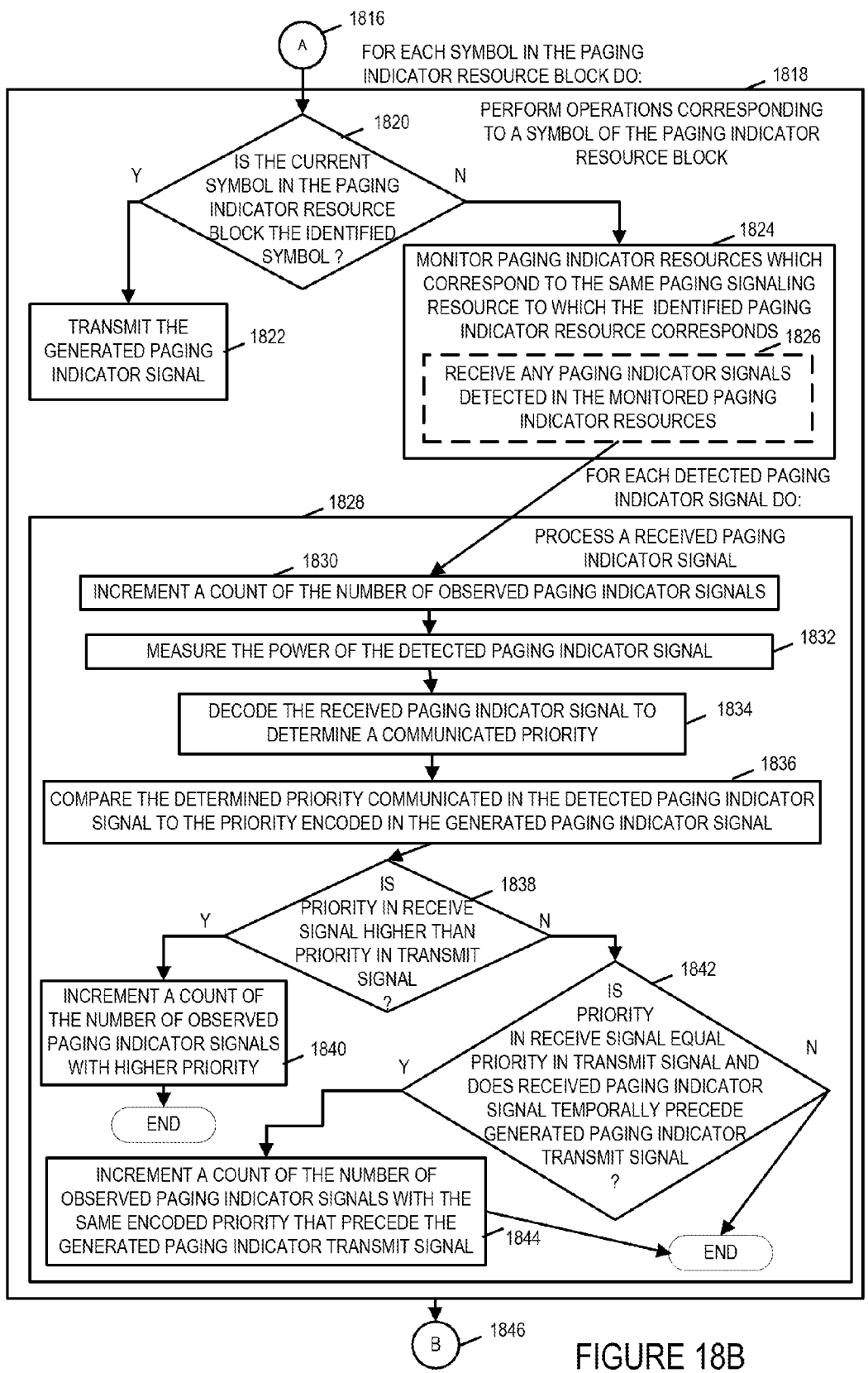
FIG. 18B is a second part of a flowchart of an exemplary method of operating a wireless terminal in accordance with an exemplary embodiment.
Figure 18D:
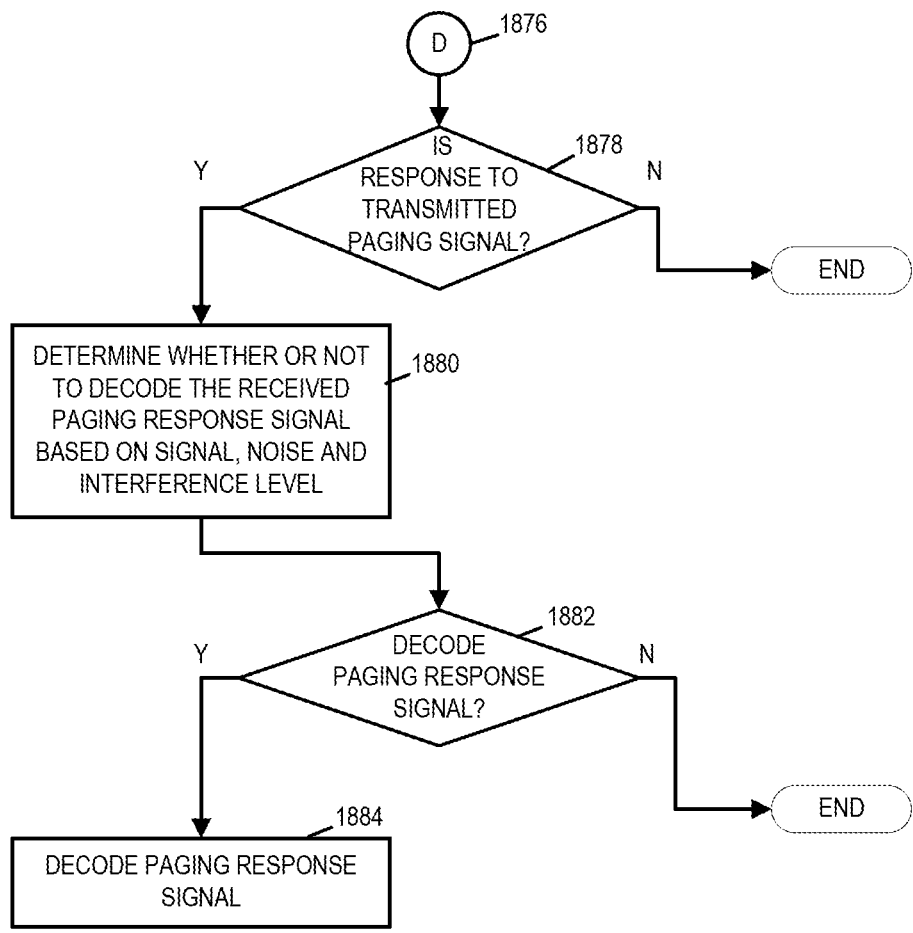
FIG. 18D is a fourth part of a flowchart of an exemplary method of operating a wireless terminal in accordance with an exemplary embodiment.
Figure 18E:
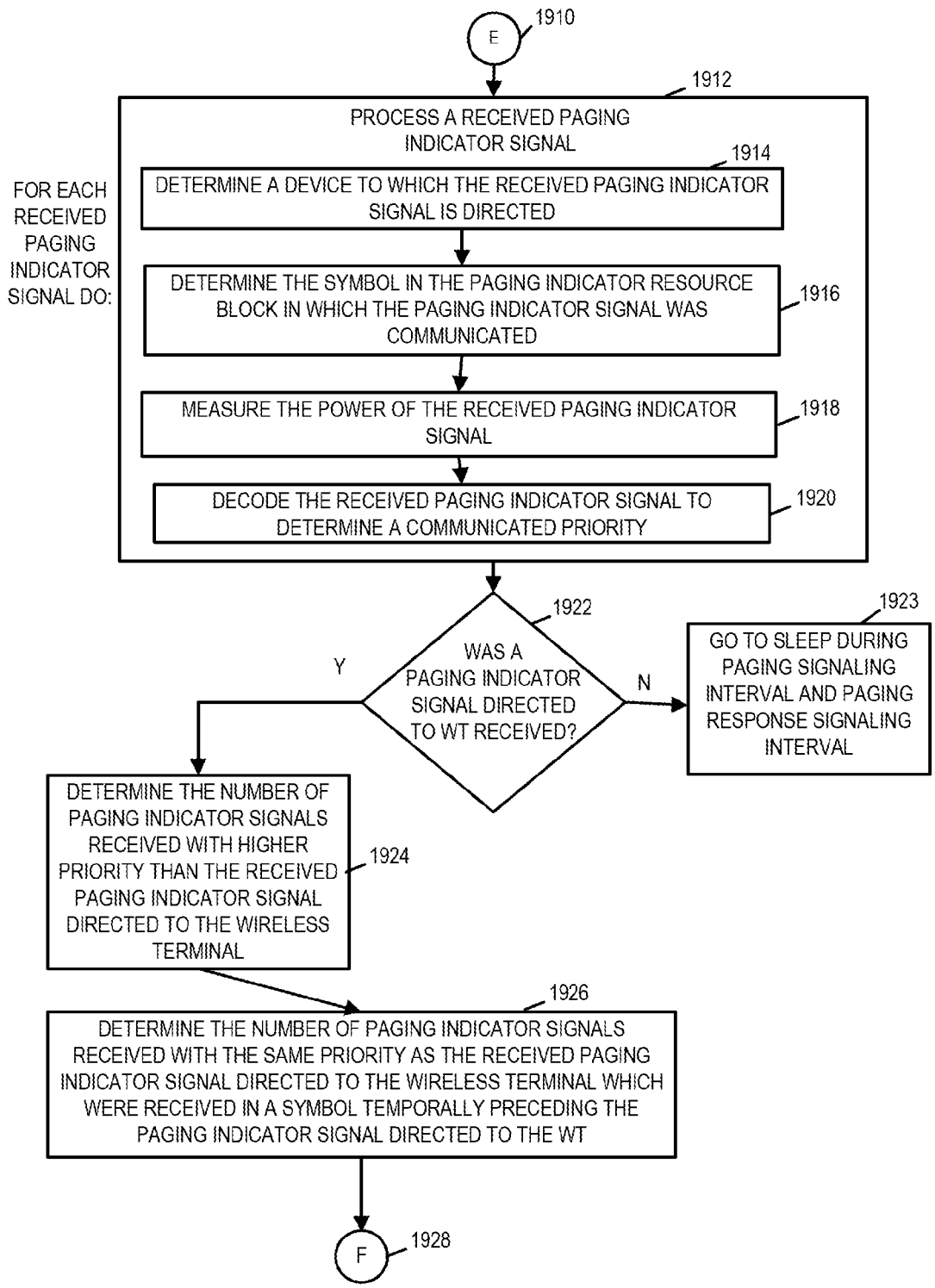
FIG. 18E is a fifth part of a flowchart of an exemplary method of operating a wireless terminal in accordance with an exemplary embodiment.
Figure 18F:
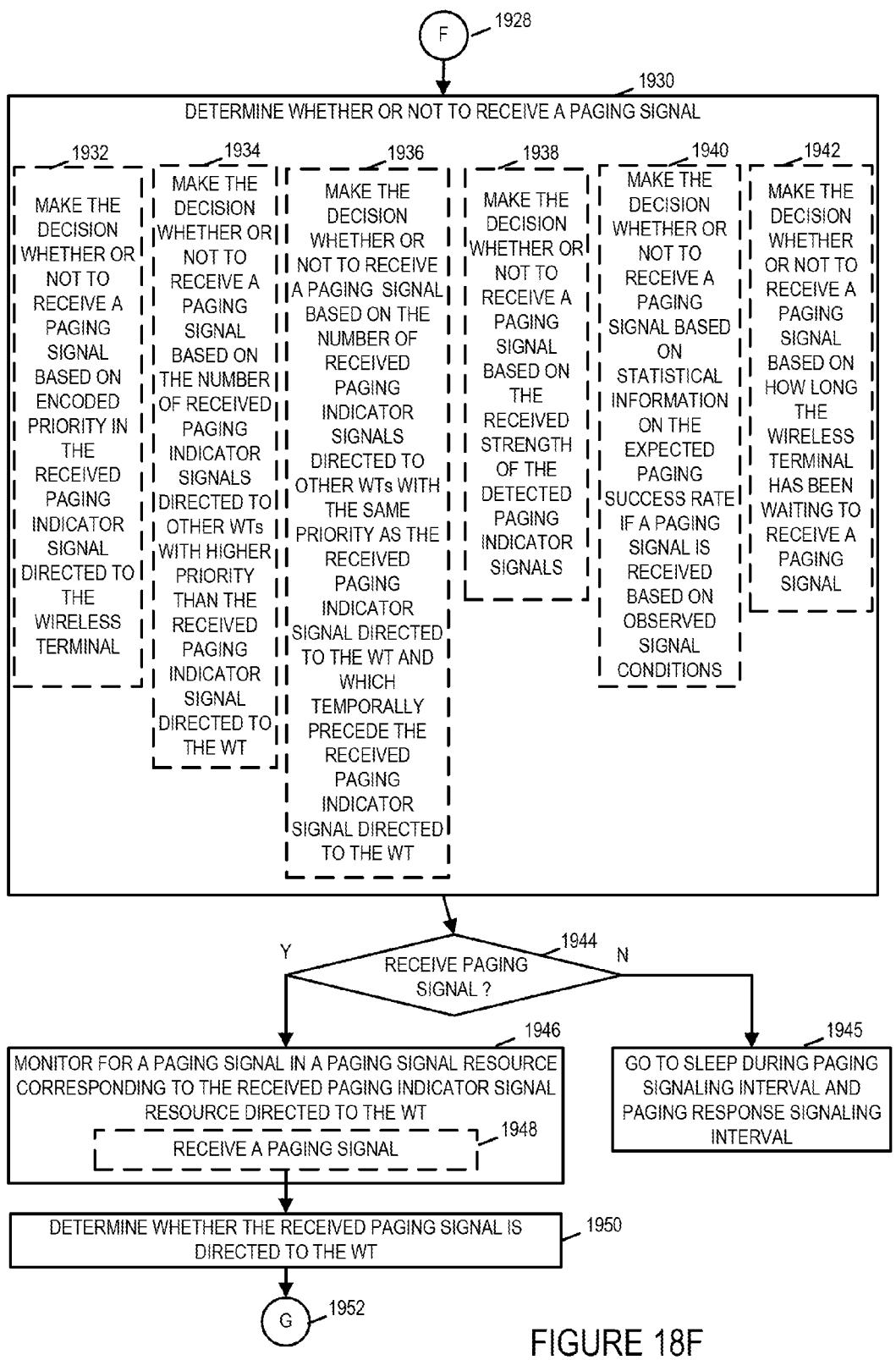
FIG. 18F is a sixth part of a flowchart of an exemplary method of operating a wireless terminal in accordance with an exemplary embodiment.
Figure 18G:
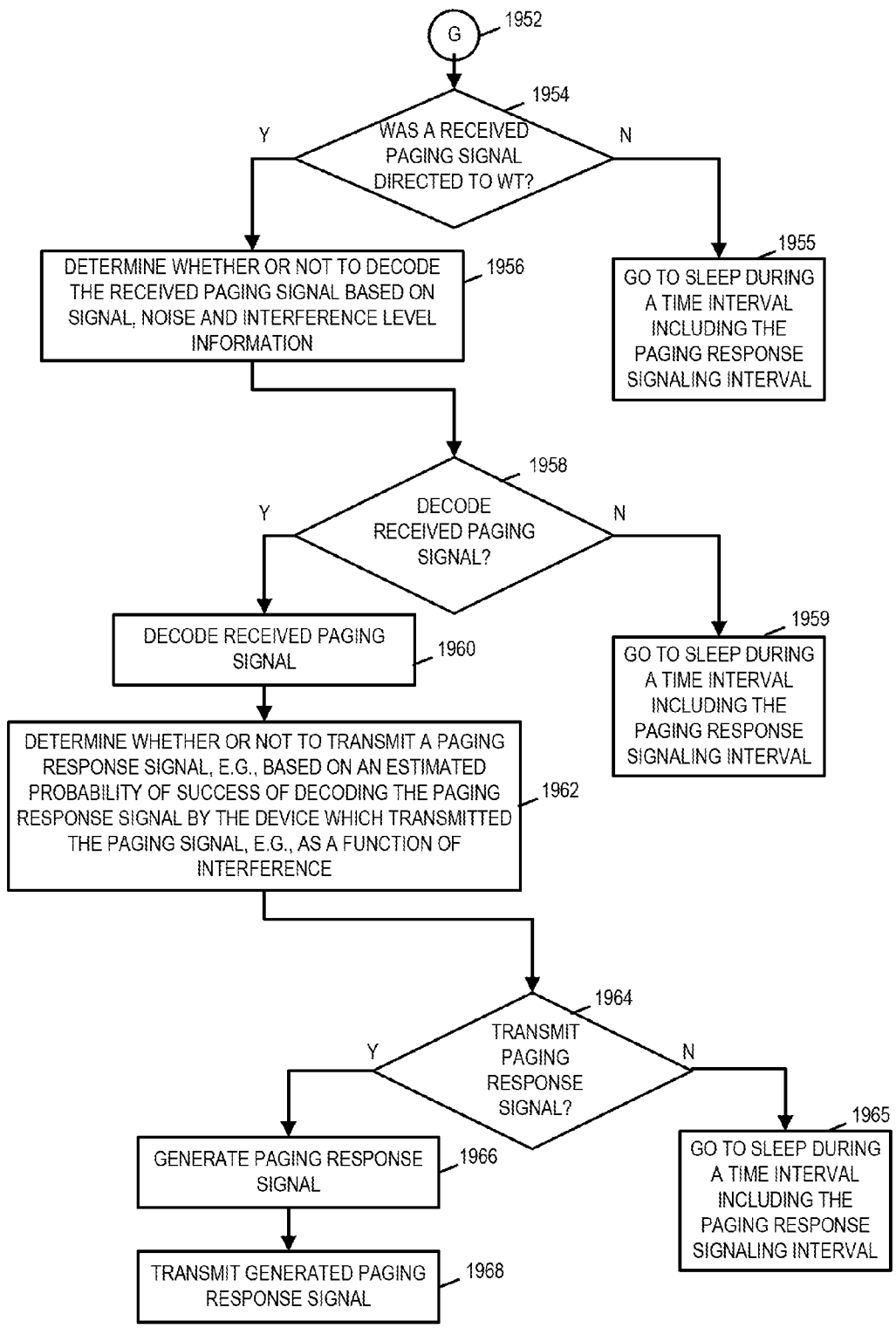
FIG. 18G is a seventh part of a flowchart of an exemplary method of operating a wireless terminal in accordance with an exemplary embodiment.

FIG. 17 is a drawing 1700 illustrating an example in which a wireless terminal desires to page another wireless terminal in an exemplary peer to peer system using the timing structure illustrated in FIGS. 13-16. Consider that a wireless terminal, e.g. a wireless terminal currently holding peer discovery device ID 3, desires to page the wireless terminal currently having the peer discovery device ID 22. The wireless terminal which desires to send the page identifies page indicator resource 1702 as the page indicator resource that it should use to send a paging indicator signal. Wireless terminal with ID 3 determines a page priority, e.g., one of four possible paging priorities. Wireless terminal with ID 3 generates a page indicator signal 1704, and as part of the page indicator signal generation wireless terminal with ID 3 includes the determined page priority in the generated paging indicator signal. Wireless terminal with ID 3 transmits the generated page indicator signal with encoded priority level information $S_{PI}$ (EPL) 1704 during the sixth OFDM symbol transmission time interval of the paging indicator signaling time interval.

The wireless terminal with ID 3 also identifies that paging signaling resource 1510 is the paging signaling resource that it will use if it should decide to send a paging signal to the wireless terminal with ID 22. The wireless terminal with ID 2 monitors the paging indicator resources 1706, 1708, 1710, 1712, 1714, 1716 and 1718 indicated by ascending dash line shading from left to right and an M. The monitored paging indicator resources are the other paging indicator resources which correspond to paging signaling resource 1510 in the paging indicator resource block 1306. In addition to the priority communicated in the paging indicator signal, in this embodiment, there is also a secondary notion of priority associated with position in the paging indicator resource block 1306, with lower index symbols corresponding to higher priority with regard to the secondary notion of priority. The wireless terminal with ID 3, monitors the seven individual paging indicator resources 1706, 1708, 1710, 1712, 1714, 1716 and 1718 measuring received signal strength and counting a number of paging indicator signals detected on the monitored paging indicator resources. In addition, the wireless terminal with ID 3 processes the received paging indicator signals and recovers the received priority information communicated in the received paging indicator signals, e.g., via decoding the encoded priority information. The wireless terminal with ID 3 counts the number of received paging indicator signals on paging indicator resources (1706, 1708, 1710, 1712, 1714, 1716, and 1718) which communicate a higher encoded priority than the determined priority encoded into signals 1704. The wireless terminal with ID 3 also counts the number of received paging indicator signals on paging indicator resources (1706, 1708, 1710, 1712 and 1714) which communicate the same encoded priority as the determined priority encoded into signals 1704.

The wireless terminal with ID 3 makes a decision whether or not to send paging signal 1720 to the wireless terminal with ID 22, e.g., in accordance with step 1022 of flowchart 1000. Consider, that in this example, the wireless terminal with ID 3 decides to send a paging signal. The wireless terminal with ID 3 generates paging signal 1720 and transmits paging signal 1720 to the wireless terminal with ID 22 using the paging signaling resource 1510. In various embodiments, a paging signal communicates a paging message including an identifier corresponding to the device being paged. Further consider that the wireless terminal with ID 22 receives the paging signal 1720 and decides to send back a paging response signal. The wireless terminal with ID 22 generates paging response signal 1722 and transmits paging response signal 1722 to the wireless terminal with ID 3 using the paging response resource 1518.

Various features and/or aspects described with respect to FIGS. 2-9, in some embodiments, are combined with features and/or aspects described with respect to FIGS. 10-17. In some embodiments, a wireless terminal makes a decision whether or not to transmit a paging indicator signal, e.g., in accordance with step 226 of FIG. 2. In some such embodiments, when the wireless terminal has decided to transmit a paging indicator signal, the wireless terminal further makes a decision whether or not to subsequently transmit a paging signal corresponding to its transmitted paging indicator signal, e.g., in accordance with step 1022 of FIG. 10.

In some embodiments, a wireless terminal which has received a paging indicator signal directed to the wireless terminal, further decides whether or not to receive a corresponding paging signal which will be transmitted to the wireless terminal. In some such embodiments, when the wireless terminal decides not to receive the paging signal, the wireless terminal conserves battery power and/or processing power. In some embodiments, when the wireless terminal decides not to receive the paging signal the wireless terminal goes to sleep.

FIG. 18, comprising the combination of FIG. 18A, FIG. 18B, FIG. 18C, FIG. 18D, FIG. 18E, FIG. 18F and FIG. 18G, is a flowchart 1800 of an exemplary method of operating a wireless terminal in accordance with an exemplary embodiment. Operation starts in step 1802, where the wireless terminal is powered on and initialized. Operation proceeds from start step 1802 to step 1804. In step 1804, the wireless terminal determines if the wireless terminal desires to page a device. If the wireless terminal desires to page a device, then operation proceeds from step 1804 to step 1806; otherwise operation proceeds from step 1804 to step 1902.

Returning to step 1806, in step 1806 the wireless terminal identifies a paging indicator resource corresponding to the device to be paged. In some embodiments, the identified paging indicator resource is an air link resource in a paging indicator resource block, and the identified paging indicator resource comprises two adjacent OFDM tone-symbols in the same OFDM symbol. Operation proceeds from step 1806 to step 1808, in which the wireless terminal identifies the symbol in a paging indicator resource block which includes the identified paging indicator resource. Operation proceeds from step 1808 to step 1810.

In step 1810 the wireless terminal determines a paging priority, e.g., as a function of an application. In some embodiments, the paging priority is one of four possible levels. Then in step 1812 the wireless terminal generates a paging indicator signal. Step 1812 includes sub-step 1814, in which the wireless terminal encodes the determined page priority in the paging indicator signal. Operation proceeds from step 1812 via connecting node A 1816 to step 1818, in which operations are performed corresponding to a symbol of the paging indicator resource block.

Step 1818 includes steps 1820, 1822, 1824, and 1828. The wireless terminal starts operations with regard to the first symbol of the paging indicator resource block.

In step 1820 the wireless terminal determines whether or not the current symbol in the paging indicator resource block is the identified symbol of step 1808. If the current symbol is the identified symbol of step 1808, then operation proceeds from step 1820 to step 1822 in which the wireless terminal transmits the generated paging indicator signal of step 1812; otherwise operation proceeds from step 1820 to step 1824.

In step 1824, the wireless terminal monitors the paging indicator resources which correspond to the same paging signaling resource to which the identified paging indicator resource of step 1806 corresponds. In this exemplary embodiment, a plurality of paging indicator resources corresponding to different wireless terminals, correspond to the same paging resource. Step 1824 includes step 1826, in which the wireless terminal receives any paging indicator signals detected in the monitored paging indicator resources. Operation proceeds from step 1826 to step 1828, which is performed for each detected paging indicator signal.

In step 1828 the wireless terminal processes a received paging indicator signal. Step 1828 includes steps 1830, 1832, 1834, 1836, 1838, 1840, 1842 and 1844. In step 1830 the wireless terminal increments a count of the number of observed paging indicator signals. In step 1832 the wireless terminal measures the power of the detected paging indicator signal, and in step 1834 the wireless terminal decodes the received paging indicator signal to determine a communicated priority. Then, in step 1836 the wireless terminal compares the determined priority, from step 1834, communicated in the detected paging indicator signal to the priority encoded in the generated paging indicator signal of step 1814. Operation proceeds from step 1836 to step 1838. In step 1838, if the priority in the received signal has been determined to be higher than the priority in the generated transmit signal, then operation proceeds from step 1838 to step 1840; otherwise, operation proceeds from step 1840 to step 1842.

Returning to step 1840, in step 1840 the wireless terminal increments a count of the number of observed paging indicator signals with higher priority than the generated paging indicator transmit signal. Returning to step 1842, in step 1842 the wireless terminal checks if two conditions are satisfied: (i) the priority in the received paging indicator signal being processed equals the priority in the generated paging indicator transmit signal and (ii) the received paging indicator signal temporally precedes the generated paging indicator transmit signal in the paging indicator resource block. In this exemplary embodiment, a notion of priority is also associated with the relative position in the paging indicator resource block, e.g., with earlier symbols in the block having higher priority than later symbols in the block.

In step 1842, if the two above-mentioned conditions are satisfied, then operation proceeds from step 1842 to step 1844 in which the wireless terminal increments a count of the number of observed paging indicator signals with the same encoded priority as the generated paging indicator transmit signal of step 1812 which precede the generated paging indicator transmit signal in the paging indicator resource block.

Operation proceeds from step 1818, via connecting node B 1846, to step 1848. In step 1848 the wireless terminal determines whether or not the paging indicator resource block has been fully processed. If the paging indicator resource block has been fully processed, then operation proceeds from step 1848 to step 1852; otherwise, operation proceeds from step 1848 to step 1850, in which the wireless terminal proceeds to the next symbol in the paging indicator resource block. Operation proceeds from step 1850 via connecting node A 1816 to step 1818 for processing of the next symbol in the paging indicator resource block.

Returning to step 1852, in step 1852 the wireless terminal makes a decision whether or not to transmit a paging signal. Step 1852, in some embodiments, includes one or more of steps 1854, 1856, 1858, 1860, 1862, and 1864. In step 1854 the wireless terminal makes the decision whether or not to transmit a paging signal based on the encoded priority in the transmitted paging indicator signal. In step 1856 the wireless terminal makes the decision whether or not to transmit a paging indicator signal based on the number of detected paging indicator signals with higher encoded priority than the priority encoded in the generated transmitted paging indicator signal. In step 1858 the wireless terminal makes the decision whether or not to transmit a paging signal based on the number of detected paging indicator signals with the same encoded priority as the encoded priority in the generated transmitted paging indicator signal, which temporally preceded the generated transmitted paging indicator signal. In step 1860 the wireless terminal makes the decision whether or not to transmit a paging indicator signal based on the received strength of the detected paging indicator signals. In step 1862 the wireless terminal makes the decision whether or not to transmit a paging signal based on statistical information on the expected paging success rate if a paging signal is transmitted based on observed signal conditions. In step 1864 the wireless terminal makes the decision whether or not to transmit a paging signal based on how long the wireless terminal has been waiting to transmit the paging signal. In various embodiments, the operations of one or more of steps 1854, 1856, 1858, 1860, 1862, and 1864 are performed in coordination, e.g., with operations being merged to produce a single decision.

Operation proceeds from step 1852 to step 1866, where the wireless terminal controls operations as function of the decision of step 1852. If the decision of step 1852 is to transmit a paging signal, then operation proceeds from step 1866 to step 1868; otherwise operation proceeds from step 1866 to end step.

Returning to step 1868, in step 1868 the wireless terminal generates a paging signal. Then in step 1870 the wireless terminal transmits the generated paging signal in the paging signaling resource corresponding to the identified paging indicator resource used to transmit the paging indicator signal. Operation proceeds from step 1870 to step 1872.

In step 1872, the wireless terminal monitors for a paging response signal in a paging response resource corresponding to the paging signaling resource. Step 1872 may, and sometimes does, include step 1873 in which the wireless terminal receives a paging response signal. Operation proceeds from step 1873 to step 1874.

In step 1874, the wireless terminal determines whether the received paging response signal is in response to the generated transmitted paging signal. In some embodiments, step 1874 includes recovering information from a portion of the received paging response signal, e.g., decoding a portion of the received paging response signal to recover an identifier.

Operation proceeds from step 1874 via connecting node D 1876 to step 1878. In step 1878 the wireless terminal controls operation as a function of the determination of step 1874. If the wireless terminal determines that the received paging response signal is in response to its transmitted paging signal, then operation proceeds from step 1878 to step 1880; otherwise operation proceeds from step 1878 to end step.

Returning to step 1880, in step 1880, the wireless terminal determines whether or not to decode the received paging response signal based on the received signal, noise and interference level. Operation proceeds from step 1880 to step 1882, where the wireless terminal controls operation as a function of the determination of step 1880. If the wireless terminal has decided to decode the received paging response signal, then operation proceeds from step 1882 to step 1884, where the wireless terminal decodes the received paging response signal; otherwise, operation proceeds from step 1882 to end step.

Returning to step 1804, if in step 1804 the wireless terminal decides that it does desire to page a device, then operation proceeds from step 1804 to step 1902. In step 1902, the wireless terminal identifies a paging indicator resource on which a paging indicator signal directed to the wireless terminal may be communicated, and in step 1904 the wireless terminal identifies the symbol in a paging indicator resource block which includes the identified paging indicator resource of step 1902. Operation proceeds from step 1904 to step 1906.

In step 1906 the wireless terminal identifies paging indicator resources corresponding to other wireless terminals which correspond to the same paging signaling resource as the identified paging indicator resource, on which a paging indicator signal directed to the wireless terminal may be communicated. Operation proceeds from step 1906 to step 1908 in which the wireless terminal monitors the identified paging indicator resources, of step 1902 and step 1906, for paging indicators signals. Operation proceeds from step 1908 via connecting node E 1910 to step 1912, which is performed for each received paging indicator signal detected on a monitored resource.

In step 1912 the wireless terminal processes a received paging indicator signal. Step 1912 includes steps 1914, 1916, 1918 and 1920. In step 1914 the wireless terminal determines the device to which the received paging indicator signal is directed. In step 1916 the wireless terminal determines the symbol in the paging indicator resource block in which the detected paging indicator signal was communicated. In step 1918 the wireless terminal measures the power of the received paging indicator signal, and in step 1920 the wireless terminal decodes the received paging indicator signal to determine a communicated priority. The results of steps 1914, 1916, 1918 and 1920 are stored and available to be used later.

When each of the detected paging indicator signals has been processed, operation proceeds from step 1912 to step 1922. In step 1922 the wireless terminal checks if a paging indicator signal directed to the wireless terminal was received. If a paging indicator signal directed to the wireless terminal was received, then operation proceeds from step 1922 to step 1924; otherwise, operation proceeds from step 1922 to step 1923, where the wireless terminal is controlled to go to sleep during the paging signaling interval and the paging response signaling interval, e.g., to conserve power.

Returning to step 1924, in step 1924 the wireless terminal determines the number of paging indicator signals received with higher encoded priority than the encoded priority of the paging indicator signal directed to the wireless terminal. Operation proceeds from step 1924 to step 1926, in which the wireless terminal determines the number of paging indicator signals received with the same encoded priority as the encoded priority of the received paging indicator signal directed to the wireless terminal which were received in a symbol temporally preceding the received paging indicator signal directed to the wireless terminal. Operation proceeds from step 1926 via connecting node F 1928 to step 1930.

In step 1930 the wireless terminal determines whether or not to receive a paging signal. Step 1930, in various embodiments, includes one or more of steps 1932, 1934, 1936, 1938, 1940 and 1942. In step 1932 the wireless terminal makes the decision whether or not to receive a paging signal based on encoded priority in the received paging indicator signal directed to the wireless terminal. In step 1934 the wireless terminal makes the decision whether or not to receive a paging signal based on the number of receive paging indicator signals directed to other wireless terminal with higher encoded priority than the priority encoded in the received paging indicator signal directed to the wireless terminal. In step 1936 the wireless terminal makes the decision whether or not to receive a paging signal based on the number of received paging indicator signal directed to other wireless terminals with the same encoded priority as the priority encoded in the received paging indicator signal directed to the wireless terminal and which temporally precede the received paging indicator signal directed to the wireless terminal. In step 1938 the wireless terminal makes the decision whether or not to receive a paging signal based on the received strength of the detected paging indicator signals. In step 1940 the wireless terminal makes the decision whether or not the receive a paging signal based on statistical information on the expected success rate if a paging signal is received based on observed signal conditions. In step 1942 the wireless terminal makes the decision whether or not to receive a paging signal based on how long the wireless terminal has been waiting to receive a paging signal. In various embodiments, the operations of one or more of steps 1932, 1934, 1936, 1938, 1940, and 1942 are performed in coordination, e.g., with operations being merged to produce a single decision.

Operation proceeds from step 1930 to step 1944. In step 1944 the wireless terminal controls operation as a function of the determination of step 1930. If the wireless terminal has determined to receive the paging signal, then operation proceeds from step 1944 to step 1946; otherwise, operation proceeds from step 1944 to step 1945 where the wireless terminal is controlled to go to sleep during the paging signaling interval and the paging response signaling interval, e.g., to conserve power.

Returning to step 1946, in step 1946 the wireless terminal monitors for a paging signal in a paging signal resource corresponding to the received paging indicator signal resource in which paging indicator signals directed to the wireless terminal are communicated. Step 1946 may, and sometimes does, include step 1948 in which the wireless terminal receives a paging signal. Operation proceeds from step 1948 to step 1950.

In step 1950 the wireless terminal determines whether or not the received paging signal of step 1948 is directed to the wireless terminal. In some embodiments, step 1950 includes decoding a portion of the received paging signal to recover an identifier. Operation proceeds from step 1950 via connecting node G 1952 to step 1954.

In step 1954 the wireless terminal controls operation as a function of the determination of step 1950. If the received paging signal of step 1950 is directed to the wireless terminal, then operation proceeds from step 1956; otherwise, operation proceeds from step 1954 to step 1955 where the wireless terminal is controlled to go to sleep during a time interval including the paging response signaling interval.

Returning to step 1956, in step 1956 the wireless terminal determines whether or not to decode the received paging signal based on the received signal, noise and interference level information. Operation proceeds from step 1956 to step 1958.

In step 1958 the wireless terminal controls operation as a function of the determination of step 1956. If the wireless terminal has determined to decode the receive paging signal in step 1956, then operation proceeds from step 1958 to step 1960; otherwise operation proceeds from step 1958 to step 1959 where the wireless terminal is controlled to go to sleep during a time interval including the paging response signaling interval.

Returning to step 1960, in step 1960 the wireless terminal determines whether or not to transmit a paging response signal, e.g., based on an estimated probability of success of decoding the paging response signal by the device which transmitted the paging signals, e.g., as a function of estimated interference. Operation proceeds from step 1962 to step 1964, in which the wireless terminal controls operation as a function of the determination of step 1962.

If the wireless terminal has determined in step 1962 to transmit a paging response signal, then operation proceeds from step 1964 to step 1966; otherwise, operation proceeds from step 1964 to step 1965 in which the wireless terminal is controlled to go to sleep during the paging response signaling interval, e.g., to conserve power.

Returning to step 1966, in step 1966 the wireless terminal generates a paging response signal, and in step 1968 the wireless terminal transmits the generated paging response signal to the device which transmitted the paging signal directed to the wireless terminal, using a paging response resource corresponding to paging signal resource.

In some embodiments a wireless terminal includes a module implemented in hardware or stored in memory corresponding to each individual step or sub-step shown in FIG. 18. The module controls the wireless terminal implement the individual step. Accordingly, in some embodiments the wireless terminal includes a processor and memory with the processor being configured to implement the steps of FIG. 18.

Various aspects and/or features of some, but not necessarily all, embodiments will be described below. In some embodiments, in order to save battery power, a wireless terminal, e.g., a mobile station, goes to sleep whenever possible to conserve energy. For example, a wireless terminal goes to sleep and then wakes up at predetermined times in a recurring schedule to perform certain operations. For example, the wireless terminal wakes up to be able to monitor a paging indicator resource block in a recurring peer to peer timing schedule being used in an ad hoc peer to peer network.

A wireless terminal, in some embodiments, wakes up to check for a paging indicator signal directed to the wireless terminal. The wireless terminal monitors a paging indicator resource corresponding to the wireless terminal for the presence of a paging indicator signal. If the wireless terminal detects a paging indicator signal directed to the wireless terminal, in some embodiments, the wireless terminal stays awake to monitor a corresponding paging signaling resource for a paging signaling. However, if the wireless terminal does not receive a paging indicator signal directed to the wireless terminal, the wireless terminal goes back to sleep.

In some embodiments an individual paging indicator resource is a relatively small amount of air link resources, e.g., one or two OFDM tone-symbols, while a paging signaling resource is a relatively large amount of air link resources, e.g., seven or more OFDM tone-symbols. In various embodiments a paging indicator signal does not explicitly carry an identifier of the device to be paged; however, the location of the paging indicator resource in the paging indicator resource block which carries the paging indicator signal implicitly conveys device identifier information. In some embodiments, the paging signal conveys a paging message. In some such embodiments, the paging signal directly conveys device identifier information.

A paging indicator signal is, in some embodiments, a broadcast signal. A wireless terminal may, and sometimes does, listen for paging indicator signals directed to other wireless terminals. Information collected corresponding to paging indicator signals corresponding to other devices may be, and sometimes is, used to make yielding decisions.

In various embodiments, multiple paging indicator resources correspond to the same paging signaling resource. Therefore, to avoid congestion on a paging signaling resource, in some embodiments, a wireless terminal, that intends to transmit a paging indicator signal, observes other paging indicator resources for other paging indicator signals before making a decision on whether or not to transmit an intended paging indicator signal and/or on whether or not to transmit an intended paging signal. Thus, a wireless terminal may, and sometimes does, decide to yield and forgo transmission of a paging indicator signal and/or a paging signal, in response to detection of and/or measurements of one or more paging indicator signals corresponding to other wireless terminals, e.g., corresponding to other wireless terminals which happen to share a common paging signaling resource.

In one scenario, an intended paging initiator identifies a device to be paged, identifies the particular paging indicator resource in the paging indicator resource block that would be used to carry the intended paging indicator signal, and identifies the symbol in the paging indicator resource block that would be used to carry the intended paging indicator signal.

The intended paging initiator monitors symbols in the paging indicator resource block which precede the symbol which would be used for transmission. The intended paging initiator observes and counts how many other paging indicator signals have already been sent by other devices in the current paging indicator resource block before the paging indicator symbol that it would use to transmit an intended paging indicator signal. In some embodiments, if there are already more paging indicator signals sent out than what the paging signaling resource can handle, then the wireless terminal may, and sometimes does, defer transmission of a paging indicator signal to some later paging slot, e.g. in accordance with a timeout mechanism. This decision on whether or not to transmit a paging indicator signal can be, and sometimes is, based on multiple factors such as, e.g., the number of observed paging indicator signals, the observed paging indicator signal strengths, statistic information on the expected paging success rate based on the observed signal conditions, the waiting time already suffered by this page, the urgency of this page, and so on. In some embodiments, the urgency of the page is based on the application. Note that in various embodiments, if a wireless terminal does not transmit a paging indicator signal, it will not transmit a paging signal either.

In some embodiments, a paging indicator resource block includes N OFDM symbols with M tones on each symbol, e.g., N×M OFDM tone-symbols. In one exemplary embodiment, a paging indicator resource block includes 8 OFDM symbols and 56 tones. In some embodiments, an individual paging indicator resource is a single OFDM tone-symbol, and thus the exemplary paging indicator resource block includes 448 individual paging indicator resources. Consider that the OFDM symbol index range is 0.7 and the tone index range is 0.55, in the exemplary paging indicator resource block.

In some embodiments, an individual paging indicator resource, e.g., a single OFDM tone-symbol in the paging indicator resource block, corresponds to a wireless terminal that may be paged. In some embodiments, a paging indicator signal is a single tone signal transmitted at a predetermined energy level during a single symbol transmission time interval. In various embodiments, a wireless terminal detects a paging indicator signal by measuring a significant amount of energy on a single tone in a single symbol, e.g., a measured signal strength of a received signal on a single OFDM tone-symbol exceeds a predetermined threshold level. In some embodiments, a wireless terminal identifies the device to which the received paging indicator signal is directed by identifying the particular paging indicator resource, e.g., particular OFDM tone-symbol, on which the paging indicator signal was received and using predetermined information mapping particular paging indicator resources in the paging indicator resource block to particular device identifiers. The paging indicator resource corresponding to a particular wireless terminal, in some embodiments, is a function of time and/or a paging slot number, e.g., in accordance with predetermined information known to the wireless terminals.

Assume that wireless terminal A, e.g. mobile A, wants to page wireless terminal B, e.g., mobile B. Wireless terminal A should send a paging indicator signal using the paging indicator resource, e.g., OFDM tone-symbol, corresponding to wireless terminal B. For example, consider that the OFDM tone-symbol corresponding to wireless terminal B occurs in the third OFDM symbol of the paging indicator resource block, e.g., tone index value=5, and symbol index value=2. Wireless terminal B will monitor for and detect for the significant energy at the paging indicator resource on which it expects to receive paging indicator signals directed to wireless terminal B, e.g., it monitors the resource with tone index value=5 and symbol index value=2.

Instead of wireless terminal A simply going ahead and transmitting a paging indicator signal to wireless terminal B, oblivious of other paging activity, in some embodiments, wireless terminal A considers other paging activity and may, and sometimes does yield to other pages. Wireless terminal A observes symbols 0-1 and counts how many paging signals have been sent by other wireless terminals, e.g., corresponding to the same paging signaling resource. Consider that wireless terminal A has some statistical knowledge about the paging signaling channel performance, e.g., half of the paging signals will not go through if there are more than 20 of them sharing the same paging resource. Then wireless terminal A makes a decision on whether or not it will transmit its intended paging indicator signal to wireless terminal B in the current paging slot, e.g., based on its paging indicator observations and/or the statistical information on paging performance. In this exemplary case, an implicit priority of paging indicator signals is implied by the order of the symbols where the paging indicator signals are to be sent. In various embodiments, a paging signaling resource corresponding to a particular wireless terminal can, and sometimes does, vary from one paging slot to another, e.g., in accordance with a predetermined mapping. In this way a wireless terminal can have different paging priorities in different time slots of the timing structure.

In another embodiment, the paging-initiating wireless terminal goes ahead with transmission of the paging indicator signal, and make a decision of whether or not to transmit in the paging signaling resource after observing paging indicator signals, e.g., corresponding to each of the symbols in the paging indicator resource block in which it is not transmitting a paging indicator signal. In some such embodiments, a paging indicator signals explicitly communicates some priority bits of the page, which are included in the paging indicator signal, e.g., as encoded information. For example, in one such embodiment, a page may be of four priority levels, with 4 having the highest priority and 1 having the lowest priority. In some such embodiments, an explicitly communicated page priority is determined as a function of application. A paging indicator signal, in some embodiments, uses two adjacent tones on the same OFDM symbol to communicate the 2-bit priority. Thus in some such embodiments, an individual paging indicator resource includes 2 adjacent OFDM tone-symbols in the same OFDM symbol. In addition, in some embodiments, the order of the paging indicator symbols can still serve as an implicit priority indicator among paging indicator signals with the same explicit priority bits.

In some embodiments, a paging initiator monitors for paging indicator signals on each of the OFDM symbols other than the one it is using for transmission, e.g., due to a half-duplex limitation. At the end of the paging indicator signaling time interval, the paging initiator makes a decision on whether or not to transmit a paging signal in the paging signaling resource. The decision, in some embodiments, is based on one or more or all of: its own paging priority, the number of observed paging indicator signals with higher priorities, the number of observed paging indicator signals with the same priority but before the symbol that it used for transmitting a paging indicator signal, the observed indicator signal strength, statistic information on the paging success rate based on the observed signal condition, and the waiting time already suffered by this page, and so on.

In some embodiments, for a paging destination, i.e., a pure receiver, during the paging indicator time interval, the wireless terminal can, and sometimes does, observe each of the paging indicator signals and, if a paging indicator signal is directed to the wireless terminal, the wireless terminal makes a decision on whether or not to receive in the paging signaling resource based on a similar decision-making criteria as described above with regard to a decision whether or not to transmit. If the wireless terminal decides not to receive, it can go, and sometimes does, go to sleep during the paging signaling interval thus conserving energy.

In the paging resource, the paging destination wireless terminal can, and sometimes does, also estimate the number and strength of the interferers to its signal and/or to its paging response signal that it is supposed to send back to the paging wireless terminal. In some embodiments, even if a wireless terminal receives a paging signal and recovers the information correctly, e.g., a paging message communicating a paging request, the wireless terminal may, and sometimes does, volunteer not to send a paging response back for this paging slot, e.g., if statistical information shows that the paging initiating wireless terminal is not expected to be able to decode the response correctly with a high probability due to excess interference.

In some embodiments, paging indicator signals are referred to as quick paging signals, paging signals are referred to as full paging channel signals, and paging response signals are referred to as full paging channel response signals.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless terminal, comprising:
monitoring a portion of a set of paging indicator resources used to communicate paging indicator signals, an individual paging indicator resource mapping to one or more corresponding devices, each paging indicator signal indicating an intention by a device to transmit a paging signal;
determining the number of paging indicator signals detected on said monitored portion of said set of paging indicator resources; and
making a decision whether or not to transmit a paging indicator signal from the wireless terminal based on the determined number of detected paging indicator signals, said paging indicator signal from the wireless terminal indicating an intention by said wireless terminal to transmit a paging signal from the wireless terminal.

2. The method of claim 1, further comprising:
measuring energy of signals communicated on paging indicator resources corresponding to a paging signaling resource to be used if said paging signal from the wireless terminal is to be transmitted.

3. The method of claim 2, wherein said decision whether or not to transmit said paging indicator signal from the wireless terminal is also based on the measured energy.

4. The method of claim 3, wherein said decision whether or not to transmit said paging indicator signal from the wireless terminal is further based on:
stored statistical information indicating a probability of paging success.

5. The method of claim 3, wherein said decision whether or not to transmit said paging indicator signal from the wireless terminal is further based on an amount of time the wireless terminal has been waiting to transmit a paging indicator signal to a device which the wireless terminal intends to page.

6. The method of claim 1, wherein multiple paging indicator resources correspond to the same paging signaling resource, at least some of said multiple paging indicator resources corresponding to the same paging signaling resource occurring in different transmission time slots, at least one of said different transmission time slots following said monitoring.

7. A wireless terminal, comprising:
means for monitoring a portion of a set of paging indicator resources used to communicate paging indicator signals, an individual paging indicator resource mapping to one or more corresponding devices, each paging indicator signal indicating an intention by a device to transmit a paging signal;
means for determining the number of paging indicator signals detected on said monitored portion of said set of paging indicator resources; and
means for making a decision whether or not to transmit a paging indicator signal from the wireless terminal based on the determined number of detected paging indicator signals, said paging indicator signal from the wireless terminal indicating an intention by said wireless terminal to transmit a paging signal from the wireless terminal.

8. The wireless terminal of claim 7, further comprising:
means for measuring energy of signals communicated on paging indicator resources corresponding to a paging signaling resource to be used if said paging signal from the wireless terminal is to be transmitted.

9. The wireless terminal of claim 8, wherein said decision whether or not to transmit said paging indicator signal from the wireless terminal is also based on the measured energy.

10. The wireless terminal of claim 9, wherein said decision whether or not to transmit said paging indicator signal from the wireless terminal is further based on:
stored statistical information indicating a probability of paging success.

11. A computer program product for use in a wireless terminal, the computer program product comprising:
a non-transitory computer readable medium comprising:
code for causing at least one computer to monitoring a portion of a set of paging indicator resources used to communicate paging indicator signals, an individual paging indicator resource mapping to one or more corresponding devices, each paging indicator signal indicating an intention by a device to transmit a paging signal;
code for causing said at least one computer to determine the number of paging indicator signals detected on said monitored portion of said set of paging indicator resources; and
code for causing said at least one computer to make a decision whether or not to transmit a paging indicator signal from the wireless terminal based on the determined number of detected paging indicator signals, said paging indicator signal from the wireless terminal indicating an intention by said wireless terminal to transmit a paging signal from the wireless terminal.

12. A wireless terminal comprising:
at least one processor configured to:
monitor a portion of a set of paging indicator resources used to communicate paging indicator signals, an individual paging indicator resource mapping to one or more corresponding devices, each paging indicator signal indicating an intention by a device to transmit a paging signal;
determine the number of paging indicator signals detected on said monitored portion of said set of paging indicator resources; and
make a decision whether or not to transmit a paging indicator signal from the wireless terminal based on the determined number of detected paging indicator signals, said paging indicator signal from the wireless terminal indicating an intention by said wireless terminal to transmit a paging signal from the wireless terminal; and
memory coupled to said at least one processor.

13. The wireless terminal of claim 12, wherein said at least one processor is further configured to:
measure energy of signals communicated on paging indicator resources corresponding to a paging signaling resource to be used if said paging signal from the wireless terminal is to be transmitted.

14. The wireless terminal of claim 13, wherein said at least one processor is configured to base the decision whether or not to transmit said paging indicator signal from the wireless terminal on the measured energy.

15. The wireless terminal of claim 14, wherein said at least one processor is further configured to base said decision whether or not to transmit said paging indicator signal from the wireless terminal on:
stored statistical information indicating a probability of paging success.

16. A method of operating a wireless terminal comprising:
identifying a paging indicator resource to use in transmitting a paging indicator signal;

transmitting a paging indicator signal from the wireless terminal on the identified paging indicator resource, said paging indicator signal indicating an intention by said wireless terminal to transmit a paging signal from the wireless terminal and a page priority; and
making a decision, based on said page priority, whether or not to transmit said paging signal from the wireless terminal using a paging signaling resource corresponding to said identified paging indicator resource.

17. The method of claim 16, further comprising:
determining said page priority prior to transmitting said paging indicator signal.

18. The method of claim 17, further comprising:
receiving paging indicator signals transmitted by other devices on additional paging indicator resources corresponding to said paging signaling resource;
counting a number of said received paging indicator signals having a higher priority than said determined page priority; and
wherein making a decision whether or not to transmit said paging signal from the wireless terminal is also based on said counted number of received paging indicator signals having a higher priority than said determined page priority.

19. The method of claim 17, further comprising:
receiving paging indicator signals transmitted by other devices on additional paging indicator resources corresponding to said paging signaling resource;
counting a number of said received paging indicator signals having a priority which is the same as said determined page priority and which are received prior to transmission of said paging indicator signal in a paging indicator resource block in which said paging indicator signal is transmitted; and
wherein making a decision whether or not to transmit said paging signal from the wireless terminal is also based on said counted number of received paging indicator signals having a priority which is the same as said determined page priority.

20. The method of claim 16, further comprising:
receiving paging indicator signals transmitted by other devices on additional paging indicator resources corresponding to said paging signaling resource; and
wherein making a decision whether or not to transmit said paging signal from the wireless terminal is also based on the received signal strength of detected paging indicator signals transmitted by other devices on additional paging indicator resources corresponding to said paging signaling resource.

21. The method of claim 16, wherein making a decision whether or not to transmit said paging signal from the wireless terminal is also based on statistical information on the expected paging success if a paging signal is transmitted based on observed signal conditions.

22. A wireless terminal comprising:
means for identifying a paging indicator resource to use in transmitting a paging indicator signal;
means for transmitting a paging indicator signal from the wireless terminal on the identified paging indicator resource, said paging indicator signal indicating an intention by said wireless terminal to transmit a paging signal from the wireless terminal and a page priority; and
means for making a decision, based on said page priority, whether or not to transmit said paging signal from the wireless terminal using a paging signaling resource corresponding to said identified paging indicator resource.

23. The wireless terminal of claim 22, further comprising:
means for determining said page priority prior to transmitting said paging indicator signal.

24. The wireless terminal of claim 23, further comprising:
means for receiving paging indicator signals transmitted by other devices on additional paging indicator resources corresponding to said paging signaling resource;
means for counting a number of said received paging indicator signals having a higher priority than said determined page priority; and
wherein said means for making a decision whether or not to transmit said paging signal from the wireless terminal also bases the decision on said counted number of received paging indicator signals having a higher priority than said determined page priority.

25. The wireless terminal of claim 23, further comprising:
means for receiving paging indicator signals transmitted by other devices on additional paging indicator resources corresponding to said paging signaling resource;
means for counting a number of said received paging indicator signals having a priority which is the same as said determined page priority and which are received prior to transmission of said paging indicator signal in a paging indicator resource block in which said paging indicator signal is transmitted; and
wherein said means for making a decision whether or not to transmit said paging signal from the wireless terminal also bases its decision on said counted number of received paging indicator signals having a priority which is the same as said determined page priority.

26. A computer program product for use in a wireless terminal, the computer program product comprising:
a non-transitory computer readable medium comprising:
code for causing at least one computer to identify a paging indicator resource to use in transmitting a paging indicator signal;
code for causing said at least one computer to transmit a paging indicator signal from the wireless terminal on the identified paging indicator resource, said paging indicator signal indicating an intention by said wireless terminal to transmit a paging signal from the wireless terminal and a page priority; and
code for causing said at least one computer to make a decision, based on said page priority, whether or not to transmit said paging signal from the wireless terminal using a paging signaling resource corresponding to said identified paging indicator resource.

27. A wireless terminal comprising:
at least one processor configured to:
identify a paging indicator resource to use in transmitting a paging indicator signal;
transmit a paging indicator signal from the wireless terminal on the identified paging indicator resource, said paging indicator signal indicating an intention by said wireless terminal to transmit a paging signal from the wireless terminal and a page priority; and
make a decision, based on said page priority, whether or not to transmit said paging signal from the wireless terminal using a paging signaling resource corresponding to said identified paging indicator resource; and
memory coupled to said at least one processor.

28. The wireless terminal of claim 27,
wherein said at least one processor is configured to determine said page priority prior to transmitting said paging indicator signal.

29. The wireless terminal of claim 28,
wherein said at least one processor is further configured to:
    receive paging indicator signals transmitted by other devices on additional paging indicator resources corresponding to said paging signaling resource;
    count a number of said received paging indicator signals having a higher priority than said determined page priority; and
wherein said at least one processor is configured to also base the decision whether or not to transmit said paging signal from the wireless terminal on said counted number of received paging indicator signals having a higher priority than said determined page priority, as part of being configured to make a decision whether or not to transmit a paging signal.

30. The wireless terminal of claim 28,
wherein said at least one processor is further configured to:
    receive paging indicator signals transmitted by other devices on additional paging indicator resources corresponding to said paging signaling resource;
    count a number of said received paging indicator signals having a priority which is the same as said determined page priority and which are received prior to transmission of said paging indicator signal in a paging indicator resource block in which said paging indicator signal is transmitted; and
wherein said at least one processor is configured to also base the decision whether or not to transmit said paging signal from the wireless terminal on said counted number of received paging indicator signals having a priority which is the same as said determined page priority, as part of being configured to decide whether or not to transmit a paging signal.

* * * * *